(12) United States Patent
Clear et al.

(10) Patent No.: US 11,338,278 B2
(45) Date of Patent: May 24, 2022

(54) LIGHT TREATMENT OF CHROMIUM CATALYSTS AND RELATED CATALYST PREPARATION SYSTEMS AND POLYMERIZATION PROCESSES

(71) Applicant: Chevron Phillips Chemical Company LP, The Woodlands, TX (US)

(72) Inventors: Kathy S. Clear, Bartlesville, OK (US); Max P. McDaniel, Bartlesville, OK (US); William C. Ellis, Bartlesville, OK (US); Eric D. Schwerdtfeger, Bartlesville, OK (US); Deloris R. Gagan, Ramona, OK (US); Carlos A. Cruz, Kingwood, TX (US); Masud M. Monwar, Bartlesville, OK (US)

(73) Assignee: Chevron Phillips Chemical Company LP, The Woodlands, TX (US)

(*) Notice: Subject to any disclaimer, the term of this patent is extended or adjusted under 35 U.S.C. 154(b) by 0 days.

(21) Appl. No.: 17/468,820

(22) Filed: Sep. 8, 2021

(65) Prior Publication Data
US 2021/0402383 A1  Dec. 30, 2021

Related U.S. Application Data

(63) Continuation of application No. 16/571,224, filed on Sep. 16, 2019.
(Continued)

(51) Int. Cl.
*C08F 4/22* (2006.01)
*C08F 4/78* (2006.01)
(Continued)

(52) U.S. Cl.
CPC ............. *B01J 31/12* (2013.01); *B01J 8/085* (2013.01); *B01J 8/18* (2013.01); *B01J 19/123* (2013.01);
(Continued)

(58) Field of Classification Search
CPC .. B01J 23/26; B01J 37/34; B01J 37/16; C08F 2/46; C08F 4/22
See application file for complete search history.

(56) References Cited

U.S. PATENT DOCUMENTS 2,857,442 A  10/1958  Hay
3,166,537 A  1/1965  Gregg
(Continued)

FOREIGN PATENT DOCUMENTS

CN  101264953 A  * 9/2008 ............... C02F 1/30
CN  101264953 B    8/2010
(Continued)

OTHER PUBLICATIONS

Schwerdtfeger, E.; Buck, R.; McDaniel, M. Applied Catalysis A: General, 2012, 423-424, 91-99. (Year: 2012).*
(Continued)

*Primary Examiner* — Rip A Lee
(74) *Attorney, Agent, or Firm* — Merchant & Gould P.C.

(57) ABSTRACT

Catalyst preparation systems and methods for preparing reduced chromium catalysts are disclosed, and can comprise irradiating a supported chromium catalyst containing hexavalent chromium with a light beam having a wavelength within the UV-visible light spectrum. Such reduced chromium catalysts have improved catalytic activity compared to chromium catalysts reduced by other means. The use of the reduced chromium catalyst in polymerization reactor systems and olefin polymerization processes also is disclosed, resulting in polymers with a higher melt index.

26 Claims, 4 Drawing Sheets

Related U.S. Application Data

(60) Provisional application No. 62/732,020, filed on Sep. 17, 2018.

(51) Int. Cl.

| | | |
|---|---|---|
| *B01J 31/34* | (2006.01) | |
| *B01J 37/34* | (2006.01) | |
| *B01J 23/26* | (2006.01) | |
| *B01J 31/12* | (2006.01) | |
| *C08F 10/02* | (2006.01) | |
| *C08F 210/16* | (2006.01) | |
| *B01J 8/08* | (2006.01) | |
| *B01J 8/18* | (2006.01) | |
| *B01J 19/12* | (2006.01) | |
| *C08F 110/02* | (2006.01) | |
| *B01J 21/08* | (2006.01) | |
| *B01J 37/16* | (2006.01) | |

(52) U.S. Cl.
CPC .......... *C08F 10/02* (2013.01); *C08F 110/02* (2013.01); *C08F 210/16* (2013.01); *B01J 21/08* (2013.01); *B01J 23/26* (2013.01); *B01J 31/34* (2013.01); *B01J 37/16* (2013.01); *B01J 37/34* (2013.01); *B01J 37/344* (2013.01); *B01J 37/345* (2013.01); *B01J 2219/089* (2013.01); *B01J 2219/0869* (2013.01); *B01J 2219/1203* (2013.01); *B01J 2531/62* (2013.01); *C08F 4/22* (2013.01); *C08F 4/78* (2013.01)

(56) References Cited

U.S. PATENT DOCUMENTS

| | | | |
|---|---|---|---|
| 3,201,476 A | 8/1965 | Baker | |
| 3,242,099 A | 3/1966 | Manyik | |
| 3,245,179 A | 4/1966 | Hawkins | |
| 3,694,422 A | 9/1972 | Long | |
| 3,857,901 A | 12/1974 | Dowden | |
| 3,887,494 A | 6/1975 | Dietz | |
| 4,248,735 A * | 2/1981 | McDaniel | B01J 37/12 502/152 |
| 4,393,253 A | 7/1983 | Michaelson | |
| 4,460,756 A | 7/1984 | McDaniel | |
| 4,501,885 A | 2/1985 | Sherk | |
| 4,588,790 A | 5/1986 | Jenkins, III | |
| 4,794,096 A | 12/1988 | Ewen | |
| 4,808,561 A | 2/1989 | Welborn, Jr. | |
| 5,220,080 A | 6/1993 | Lyons | |
| 5,352,749 A | 10/1994 | Dechellis | |
| 5,436,304 A | 7/1995 | Griffin | |
| 5,565,175 A | 10/1996 | Hottovy | |
| 5,575,979 A | 11/1996 | Hanson | |
| 5,576,259 A | 11/1996 | Hasegawa | |
| 5,739,220 A | 4/1998 | Shamshoum | |
| 5,807,938 A | 9/1998 | Kaneko | |
| 5,919,983 A | 7/1999 | Rosen | |
| 6,239,235 B1 | 5/2001 | Hottovy | |
| 6,262,191 B1 | 7/2001 | Hottovy | |
| 6,518,375 B1 | 2/2003 | Monoi | |
| 6,825,377 B1 | 11/2004 | Beller | |
| 6,833,415 B2 | 12/2004 | Kendrick | |
| 7,112,643 B2 | 9/2006 | McDaniel | |
| 7,214,642 B2 | 5/2007 | McDaniel | |
| 7,238,756 B2 | 7/2007 | Ehrman | |
| 7,294,599 B2 | 11/2007 | Jensen | |
| 7,304,199 B2 | 12/2007 | Xu | |
| 7,326,760 B2 | 2/2008 | Cann | |
| 7,407,591 B2 * | 8/2008 | De Battisti | A62D 3/37 210/757 |
| 7,531,606 B2 | 5/2009 | Hendrickson | |
| 7,598,327 B2 | 10/2009 | Shaw | |
| 7,601,665 B2 | 10/2009 | McDaniel | |
| 7,648,940 B2 | 1/2010 | Holtcamp | |
| 7,649,062 B2 | 1/2010 | Matsunaga | |
| 7,884,163 B2 | 2/2011 | McDaniel | |
| 7,956,138 B2 | 6/2011 | Holtcamp | |
| 8,114,353 B2 * | 2/2012 | Benham | B01J 8/26 422/131 |
| 8,114,946 B2 | 2/2012 | Qing | |
| 8,309,485 B2 | 11/2012 | Qing | |
| 8,623,973 B1 | 1/2014 | McDaniel | |
| 8,703,886 B1 | 4/2014 | Qing | |
| 8,822,608 B1 | 9/2014 | Bhandarkar | |
| 8,969,228 B2 * | 3/2015 | Nazarpoor | B01J 37/0036 502/1 |
| 9,006,367 B2 | 4/2015 | McDaniel | |
| 9,023,959 B2 | 5/2015 | McDaniel | |
| 9,096,699 B2 | 8/2015 | McDaniel | |
| 9,169,337 B2 | 10/2015 | Rohatgi | |
| 9,273,170 B2 | 3/2016 | Hlavinka | |
| 9,346,897 B2 | 5/2016 | Cui | |
| 9,359,270 B2 * | 6/2016 | Daly | B01J 21/08 |
| 9,394,393 B2 | 7/2016 | Hlavinka | |
| 9,505,856 B1 | 11/2016 | Schwerdtfeger | |
| 9,796,798 B2 | 10/2017 | Praetorius | |
| 9,802,841 B2 * | 10/2017 | Maruo | C02F 1/70 |
| 9,815,925 B2 | 11/2017 | Lam | |
| 9,988,468 B2 | 6/2018 | McDaniel | |
| 10,000,594 B2 | 6/2018 | Hlavinka | |
| 10,213,766 B2 | 2/2019 | Praetorius | |
| 10,287,369 B2 | 5/2019 | Schwerdtfeger | |
| 10,358,506 B2 | 7/2019 | Ding | |
| 10,435,527 B2 | 10/2019 | Praetorius | |
| 10,442,881 B2 | 10/2019 | Hlavinka | |
| 10,590,213 B2 | 3/2020 | Rohatgi | |
| 10,654,953 B2 | 5/2020 | McDaniel | |
| 2004/0059070 A1 | 3/2004 | Whitte | |
| 2008/0032886 A1 | 2/2008 | Yeh | |
| 2014/0221692 A1 | 8/2014 | Netemeyer | |
| 2017/0073439 A1 | 3/2017 | Ewart | |
| 2017/0274356 A1 * | 9/2017 | Cann | B01J 23/26 |
| 2018/0079845 A1 | 3/2018 | Antonios | |
| 2019/0184389 A1 * | 6/2019 | Neygandhi | B01J 37/16 |
| 2019/0308172 A1 * | 10/2019 | Zou | B01J 35/1047 |
| 2020/0087430 A1 | 3/2020 | Clear | |
| 2021/0077981 A1 | 3/2021 | Cruz | |
| 2021/0078920 A1 | 3/2021 | Cruz | |
| 2021/0078926 A1 | 3/2021 | Barr | |
| 2021/0078927 A1 | 3/2021 | McDaniel | |

FOREIGN PATENT DOCUMENTS

| | | | | |
|---|---|---|---|---|
| CN | 107486197 A | * | 12/2017 | ............ B01J 23/26 |
| CN | 108439533 A | * | 8/2018 | ............... C02F 1/32 |
| CN | 106893015 B | | 9/2019 | |
| CN | 108439533 B | | 7/2020 | |
| DE | 2653666 A1 | | 5/1978 | |
| EP | 1041085 B1 | | 8/2002 | |
| GB | 1350560 A | | 4/1974 | |
| JP | 2012101986 A | | 5/2012 | |
| WO | 2020060888 A2 | | 3/2020 | |

OTHER PUBLICATIONS

Awasthy, A.K. and Jan Rocek, "The Nature of the Transition State in the Oxidation of Olefins by Chromium (VI)," JACS 91;4, Feb. 12, 1969, pp. 991-996.

Baker, L. M., et al., Oxidation of olefins by supported chromium oxide, The Journal of Organic Chemistry, vol. 33, No. 2, pp. 616-618 (Year: 1968).

Bird, R. Byron, et al., "Dynamics of Polymeric Liquids," Fluid Mechanics, vol. 1, Second Edition, 1987, cover page, publishing page, pp. xiii-xviii, and 171-172, John Wiley & Sons, Inc.

Brunauer, et al., "Adsorption of Gases in Multimolecular Layers," Journal of the American Chemical Society. 1938, vol. 60, pp. 309-319.

Christian Limberg, et al., "NMR Spectroscopic Evidence for Chromium(iv) Alkoxides With a-hydrogen Atoms," Chem. Commun., Dec. 31, 1998, pp. 225-226.

(56) References Cited

OTHER PUBLICATIONS

Cotton, F. Albert, et al., "Advanced Inorganic Chemistry," Sixth Edition, cover page, title page, pp. ix-x, and book description, Mar. 30, 1999, John Wiley & Sons, Inc.
Economy, et.al., "Supported Barium Chromate—A New Oxidation Catalyst", J. Catalysis, vol. 4, No. 4, Aug. 1, 1965, pp. 446-453.
Film Extrusion Manual—Process, Materials, Properties, TAPPI Press, 1992, 16 pages.
Finch, "Reduction Studies on Supported Chromic Anhydride Catalysts," Journal of Catalysis, 43, 1976, pp. 111-121.
George Halsey, "Physical Adsorption on Non-Uniform Surfaces," Journal Chem. Phys., vol. 16, Mar. 9, 1948, pp. 931-937.
Hieber, C. A., et al., "Shear-rate-dependence modeling of polymer melt viscosity," Polymer Engineering and Science, Jul. 1992, pp. 931-938, vol. 32, No. 14.
Hieber, C. A., et al., "Some correlations involving the shear viscosity of polystyrene melts," Rheol Acta, 1989, pp. 321-332, vol. 28.
International Search Report and Written Opinion issued in corresponding application No. PCT/US2019/051213 dated Jul. 1, 2020, 20 pages.
International Search Report and Written Opinion issued in related application No. PCT/US2020/050657 dated Dec. 21, 2020, 15 pages.
International Search Report and Written Opinion, PCT/US2020/050655, dated Dec. 3, 2020, 16 pages.
IUPAC Compendium of Chemical Terminology, 2nd Ed. 1997, pp. 1-1670.
Janzen, et al., "Diagnosing Long-Chain Branching in Polyethylene," Journal of Mol. Struct., 485/486, 1999, pp. 569-584.
Kohler, et al., "Infrared Spectroscopic Characterization of Chromium Carbonyl Species Formed by Ultraviolet Photoreduction of Silica-Supported Chromium(VI) in Carbon Monoxide," J Phys. Chem. 1994, 98, pp. 4336-4342.
McDaniel, et. al., "The Activation Of The Phillips Polymerization Catalyst; I. Influence Of The Hydroxyl Population", J. Catalysis, vol. 82, No. 1, Jul. 1, 1983, pp. 98-109.
Milas, N .A., The hydroxylation of unsaturated substances. 111. The use of vanadium pentoxide and chromium trioxide as Catalysts of hydroxylation, The Journal of the American Chemical Society, vol. 59, No. 11, pp. 2342-2344 (Year: 1937).
Milas, N.A et al., The hydroxylation of unsaturated substances. IV. The catalytic hydroxylation of unsaturated hydrocarbons, The Journal of the American Chemical Society, vol. 59, No. 11, pp. 2345-2347 (Year: 1937).
Mino, et al., "Photoinduced Ethylene Polymerization on the CrVI/SiO2 Phillips Catalyst," J. Phys. Chem. C 2019, 123, 13 pp. 8145-8152.
Modern Plastics Encyclopedia, Mid-Nov. 1995 Issue, vol. 72, No. 12, 3 pages.
Related U.S. Appl. No. 63/077,761, filed Sep. 14, 2020.
Schwerdtfeger, E., et al., Reduction of Cr(VI) polymerizationcatalysts by non-olefinic hydrocarbons, Applied Catalysis A: General, 423-424, pp. 91-99 (Year: 2012).
Shiliang Zhang, et al.; "Ethylene/1-Hexene Copolymerization with A Novel SiO 2-Supported Inorganic and Organic Hybrid Chromium-based Catalyst," Macromolecular Reaction Engineering, vol. 7, No. 6, Apr. 10, 2013, pp. 254-266.
Weckhuysen et al., "Alkane dehydrogenation over supported chromium oxide catalysts," Catalysis Today 51 (1999) pp. 223-232.
Welch, et al., "The Activation Of The Phillips Polymerization Catalyst; II. Activation By Reduction-Reoxidation", J Catalysis, vol. 82, No. 1, Jul. 1, 1983, pp. 110-117.

\* cited by examiner

US 11,338,278 B2

LIGHT TREATMENT OF CHROMIUM CATALYSTS AND RELATED CATALYST PREPARATION SYSTEMS AND POLYMERIZATION PROCESSES

REFERENCE TO RELATED APPLICATION

This application is a continuation application of U.S. patent application Ser. No. 16/571,224, filed on Sep. 16, 2019, now U.S. Pat. No. 11,173,475, which claims the benefit of U.S. Provisional Patent Application No. 62/732,020, filed on Sep. 17, 2018, the disclosures of which are incorporated herein by reference in their entirety.

FIELD OF THE INVENTION

The present disclosure generally relates to chromium catalysts, methods for preparing the chromium catalysts, methods for using the chromium catalysts to polymerize olefins, the polymer resins produced using such chromium catalysts, and articles produced using these polymer resins. More particularly, the present disclosure relates to irradiating a supported hexavalent chromium catalyst with UV-visible light, and associated catalyst preparation systems, polymerization reactor systems, and olefin polymerization processes.

BACKGROUND OF THE INVENTION

Chromium catalysts are among the most common catalysts used in olefin polymerizations. Supported chromium catalysts often are prepared by impregnating chromium onto a solid support, e.g., a solid oxide, followed by a calcining step. Generally, calcining is conducted in an oxidizing atmosphere, such that the chromium species within the supported chromium catalyst can be converted to hexavalent chromium.

There are methods to reduce supported chromium catalysts to lower oxidations states, such as Cr(II), Cr(III), Cr(IV), and Cr(V), but such methods often require high temperature, reduce catalyst activity, and result in polymers with poor melt index potential. It would be beneficial to prepare reduced chromium catalysts that do not suffer from these deficiencies. Accordingly, it is to these ends that the present invention is generally directed.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

One aspect of the present invention is directed to catalyst preparation systems that can comprise (a) a catalyst preparation vessel configured to irradiate a slurry of a supported chromium catalyst in a diluent with a light beam at a wavelength in the UV-visible spectrum, (b) a catalyst inlet configured to introduce the slurry of the supported chromium catalyst into the catalyst preparation vessel, wherein at least a portion of the chromium is in the hexavalent oxidation state, and (c) a reduced catalyst outlet configured to withdraw a slurry of a reduced chromium catalyst from the catalyst preparation vessel. Polymerization reactor systems incorporating the catalyst preparation systems also are disclosed herein.

Methods for reducing a chromium catalyst for olefin polymerization are provided in another aspect of the present invention. A representative method can comprise irradiating a reductant and a supported chromium catalyst comprising chromium in the hexavalent oxidation state with a light beam at a wavelength in the UV-visible spectrum to reduce at least a portion of the supported chromium catalyst to form a reduced chromium catalyst.

Olefin polymerization processes are provided in yet another aspect of this invention, and such processes can comprise (I) irradiating a reductant and a supported chromium catalyst comprising chromium in the hexavalent oxidation state with a light beam at a wavelength in the UV-visible spectrum to convert at least a portion of the supported chromium catalyst to form a reduced chromium catalyst, and (II) contacting the reduced chromium catalyst and an optional co-catalyst with an olefin monomer and an optional olefin comonomer in a polymerization reactor system under polymerization reaction conditions to produce an olefin polymer.

Reduced chromium catalysts and olefin polymers produced by the respective methods and processes also are encompassed herein. Unexpectedly, and beneficially, the reduced chromium catalysts can have a higher catalyst activity and/or productivity compared to chromium catalysts prepared without an irradiation step. Moreover, olefin polymers described herein often are characterized by higher melt flow properties and a narrower molecular weight distribution than olefin polymers produced by processes using reduced chromium catalysts prepared without an irradiation step.

Ethylene-based polymers having an unexpected and beneficial combination of properties also are disclosed herein. An ethylene polymer in one aspect of this invention can be characterized by a ratio of Mw/Mn in a range from about 30 to about 110, a ratio of Mz/Mw in a range from about 4 to about 10, and a CY-a parameter in a range from about 0.2 to about 0.4. An ethylene polymer in another aspect of this invention can be characterized by a ratio of Mw/Mn in a range from about 6 to about 15, a ratio of Mz/Mw in a range from about 30 to about 70, and a melt index in a range from about 0.5 to about 10 g/10 min.

Both the foregoing summary and the following detailed description provide examples and are explanatory only. Accordingly, the foregoing summary and the following detailed description should not be considered to be restrictive. Further, features or variations can be provided in addition to those set forth herein. For example, certain aspects can be directed to various feature combinations and sub-combinations described in the detailed description.

DEFINITIONS

Figure 1:
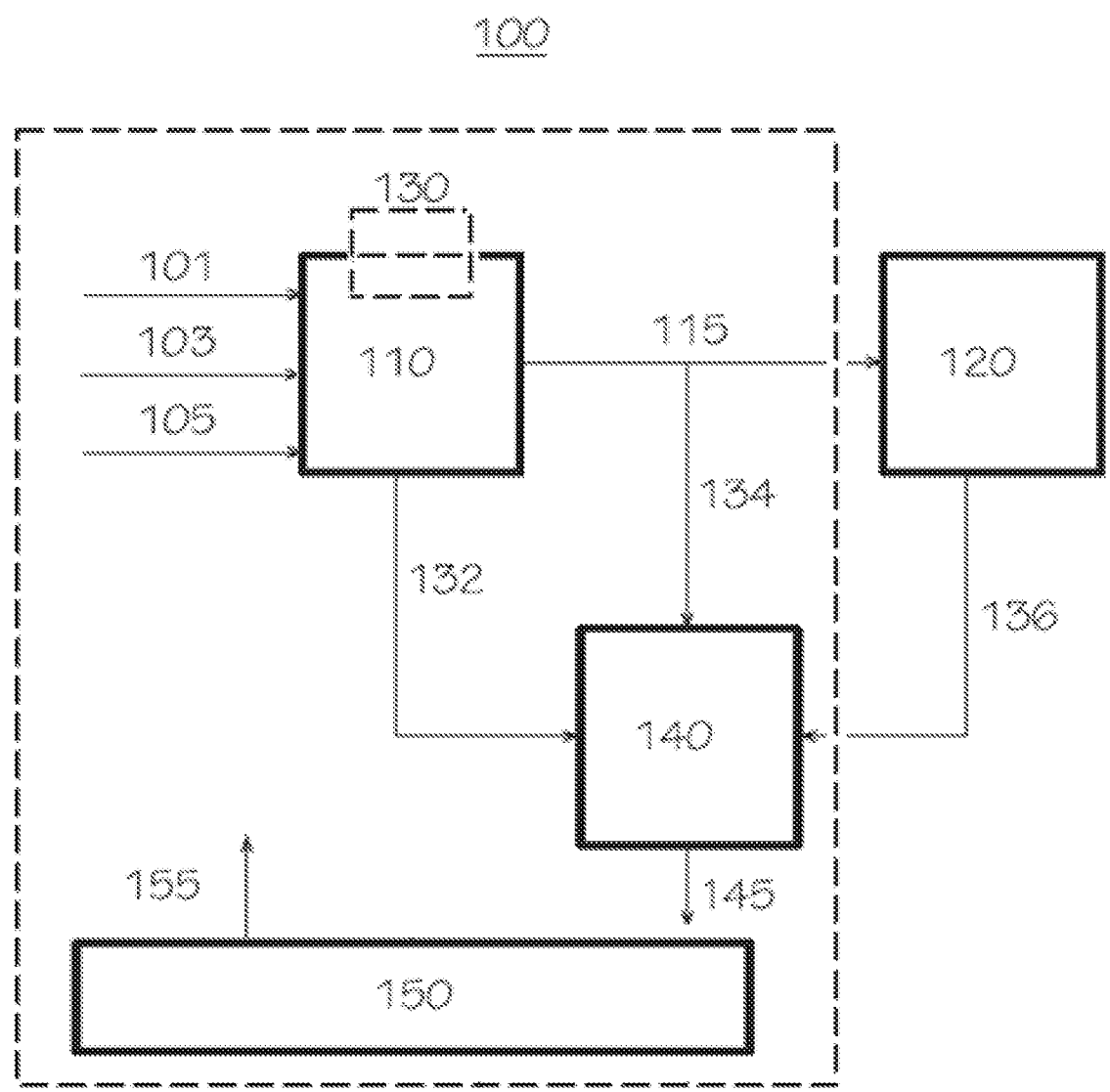
FIG. 1 illustrates a schematic block diagram of a catalyst preparation system and polymerization reactor system consistent with aspects of this invention.

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, $2^{nd}$ Ed (1997) can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Herein, features of the subject matter can be described such that, within particular aspects, a combination of different features can be envisioned. For each and every aspect and/or feature disclosed herein, all combinations that do not detrimentally affect the systems, compositions, processes, and/or methods described herein are contemplated with or without explicit description of the particular combination. Additionally, unless explicitly recited otherwise, any aspect and/or feature disclosed herein can be combined to describe inventive systems, compositions, processes, and/or methods consistent with the present disclosure.

While systems, compositions, processes, and methods are described herein in terms of "comprising" various components or steps, the systems, compositions, processes, and methods also can "consist essentially of" or "consist of" the various components or steps, unless stated otherwise.

The terms "a," "an," and "the" are intended to include plural alternatives, e.g., at least one. For instance, the disclosure of "a diluent" or "a reductant" is meant to encompass one, or mixtures or combinations of more than one, diluent or reductant, unless otherwise specified.

Generally, groups of elements are indicated using the numbering scheme indicated in the version of the periodic table of elements published in *Chemical and Engineering News,* 63(5), 27, 1985. In some instances, a group of elements can be indicated using a common name assigned to the group; for example, alkali metals for Group 1 elements, alkaline earth metals for Group 2 elements, transition metals for Group 3-12 elements, and halogens or halides for Group 17 elements.

The term "hydrocarbon" whenever used in this specification and claims refers to a compound containing only carbon and hydrogen, whether saturated or unsaturated. Other identifiers can be utilized to indicate the presence of particular groups in the hydrocarbon (e.g., halogenated hydrocarbon indicates the presence of one or more halogen atoms replacing an equivalent number of hydrogen atoms in the hydrocarbon). The term "hydrocarbyl group" is used herein in accordance with the definition specified by IUPAC: a univalent group formed by removing a hydrogen atom from a hydrocarbon (that is, a group containing only carbon and hydrogen). Non-limiting examples of hydrocarbyl groups include alkyl, alkenyl, aryl, and aralkyl groups, amongst other groups.

For any particular compound or group disclosed herein, any name or structure presented is intended to encompass all structural isomers, conformational isomers, regioisomers, stereoisomers, and mixtures thereof that can arise from a particular set of substituents, unless otherwise specified. The name or structure also encompasses all enantiomers, diastereomers, and other optical isomers (if there are any), whether in enantiomeric or racemic forms, as well as mixtures of stereoisomers, as would be recognized by a skilled artisan, unless otherwise specified. For example, a general reference to hexene (or hexenes) includes all linear or branched, acyclic or cyclic, hydrocarbon compounds having six carbon atoms and 1 carbon-carbon double bond; pentane includes n-pentane, 2-methyl-butane, and 2,2-dimethylpropane; and a butyl group includes an n-butyl group, a sec-butyl group, an iso-butyl group, and a t-butyl group.

Unless otherwise specified, the term "substituted" when used to describe a group, for example, when referring to a substituted analog of a particular group, is intended to describe any non-hydrogen moiety that formally replaces a hydrogen in that group, and is intended to be non-limiting. Also, unless otherwise specified, a group or groups can also be referred to herein as "unsubstituted" or by equivalent terms such as "non-substituted," which refers to the original group in which a non-hydrogen moiety does not replace a hydrogen within that group. Moreover, unless otherwise specified, "substituted" is intended to be non-limiting and include inorganic substituents or organic substituents as understood by one of ordinary skill in the art.

The term "polymer" is used herein generically to include olefin homopolymers, copolymers, terpolymers, and the like, as well as alloys and blends thereof. The term "polymer" also includes impact, block, graft, random, and alternating copolymers. A copolymer can be derived from an olefin monomer and one olefin comonomer, while a terpolymer can be derived from an olefin monomer and two olefin comonomers. Accordingly, "polymer" encompasses copolymers and terpolymers. Similarly, the scope of the term "polymerization" includes homopolymerization, copolymerization, and terpolymerization. Therefore, an ethylene polymer would include ethylene homopolymers, ethylene copolymers (e.g., ethylene/α-olefin copolymers), ethylene terpolymers, and the like, as well as blends or mixtures thereof. Thus, an ethylene polymer encompasses polymers often referred to in the art as LLDPE (linear low density polyethylene) and HDPE (high density polyethylene). As an example, an ethylene copolymer can be derived from ethylene and a comonomer, such as 1-butene, 1-hexene, or 1-octene. If the monomer and comonomer were ethylene and 1-hexene, respectively, the resulting polymer can be categorized an as ethylene/1-hexene copolymer. The term "polymer" also includes all possible geometrical configurations, if present and unless stated otherwise, and such configurations can include isotactic, syndiotactic, and random symmetries.

Herein, ethylene polymers also encompass ethylene-based polymers having non-traditional terminal groups or chain ends. Traditional terminal groups or chain ends include those that typically result (e.g., saturated methyl chain ends, vinyl or vinylidene chain ends) from the polymerization of ethylene, either alone or with alpha-olefin comonomers, such as 1-butene, 1-hexene, and 1-octene. Non-traditional terminal groups or chain ends encompassed herein can include various branched alkane, cyclic alkane, aromatic, and halogenated hydrocarbon groups.

The term "contacting" is used herein to describe systems, compositions, processes, and methods in which the components are combined or reacted in any order, in any manner, and for any length of time, unless otherwise specified. For example, the components can be contacted by blending or mixing, using any suitable technique.

A "soluble" material is meant to indicate that the material is dissolved at standard temperature (25° C.) and pressure (1 atm); in this regard, there is no visual precipitation of the material in the solvent (e.g., water or hydrocarbon solvent). Likewise, a "solution" is meant to indicate that there is no visual precipitate at standard temperature and pressure.

Various numerical ranges are disclosed herein. When a range of any type is disclosed or claimed herein, the intent is to disclose or claim individually each possible number that such a range could reasonably encompass, including end points of the range as well as any sub-ranges and combinations of sub-ranges encompassed therein, unless otherwise specified. As a representative example, the present application discloses, in certain aspects, that the chromium catalyst can have a total pore volume in a range from about 0.9 to about 3 mL/g. By a disclosure that the chromium catalyst can have a total pore volume in a range from about 0.9 to about 3 mL/g, the intent is to recite that the total pore volume can be any amount within the range and, for example, can be equal to about 0.9, about 1.0, about 1.1, about 1.2, about 1.3, about 1.4, about 1.5, about 1.6, about 1.7, about 1.8, about 1.9, about 2.0, about 2.1, about 2.2, about 2.3, about 2.4, about 2.5, about 2.6, about 2.7, about 2.7, about 2.8, about 2.9, or about 3 mL/g. Additionally, the total pore volume can be within any range from about 0.9 to about 3 mL/g (for example, the total pore volume can be in a range from about 1.2 to about 2.5 mL/g), and this also includes any combination of ranges between about 0.9 and about 3 mL/g. Further, in all instances, where "about" a particular value is disclosed, then that value itself is disclosed. Thus, the disclosure of a pore volume from about 0.9 to about 3 mL/g also discloses a pore volume range from 0.9 to 3 mL/g (for example, from 1.2 to 2.5 mL/g), and this also includes any combination of ranges between 0.9 and 3 mL/g. Likewise, all other ranges disclosed herein should be interpreted in a manner similar to this example.

The term "about" means that amounts, sizes, formulations, parameters, and other quantities and characteristics are not and need not be exact, but can be approximate including being larger or smaller, as desired, reflecting tolerances, conversion factors, rounding off, measurement errors, and the like, and other factors known to those of skill in the art. In general, an amount, size, formulation, parameter or other quantity or characteristic is "about" or "approximate" whether or not expressly stated to be such. The term "about" also encompasses amounts that differ due to different equilibrium conditions for a composition resulting from a particular initial mixture. Whether or not modified by the term "about," the claims include equivalents to the quantities. The term "about" can mean within 10% of the reported numerical value, preferably within 5% of the reported numerical value.

Although any methods and materials similar or equivalent to those described herein can be used in the practice or testing of the invention, the typical methods and materials are herein described.

All publications and patents mentioned herein are incorporated herein by reference for the purpose of describing and disclosing, for example, the constructs and methodologies that are described in the publications, which might be used in connection with the presently described invention.

DETAILED DESCRIPTION OF THE INVENTION

The present invention is generally directed to methods to reduce chromium catalysts by irradiating supported hexavalent chromium catalysts with light in the presence of a reductant. Catalyst preparation systems for reducing the supported hexavalent chromium catalysts, and olefin polymerizations using the reduced chromium catalysts, also are disclosed.

Methods for Reducing Chromium Catalysts

The methods to reduce chromium catalysts can comprise irradiating a reductant and a supported chromium catalyst comprising chromium in the hexavalent oxidation state with a light beam at a wavelength in the UV-visible spectrum to reduce at least a portion of the supported chromium catalyst to form a reduced chromium catalyst. The reduced chromium catalyst has an average oxidation state less than that of the supported chromium catalyst. Reduced chromium catalysts produced by any methods disclosed herein also are encompassed by this invention.

Generally, these methods are applicable to the reduction of any chromium catalyst, and are not limited to the reduction of any particular type of supported chromium catalyst. Thus, supported chromium catalysts contemplated herein encompass those prepared by contacting a solid oxide with a chromium-containing compound—representative and non-limiting examples of the chromium-compound compound include chromium (III) acetate, basic chromium (III) acetate, chromium (III) acetylacetonate, $Cr_2(SO_4)_3$, $Cr(NO_3)_3$, and $CrO_3$—and calcining in an oxidizing atmosphere to form a supported chromium catalyst. In these aspects, chromium can be impregnated during, or prior to, the calcination step, which can be conducted at a variety of temperatures and time periods, and can be generally selected to convert all or a portion of the chromium to hexavalent chromium. The irradiation methods disclosed herein can comprise reducing at least a portion of the hexavalent chromium species to a reduced oxidation state—for instance, Cr(II), Cr(III), Cr(IV), and/or Cr(V) species, any of which may be catalytically active as an olefin polymerization catalyst—and the reduced catalyst can be used to produce polymers with unexpected properties.

Any suitable chromium-containing compound (or chromium precursor) can be used as a chromium component to prepare the supported chromium catalyst. Illustrative and non-limiting examples of chromium (II) compounds can include chromium (II) acetate, chromium (II) chloride, chromium (II) bromide, chromium (II) iodide, chromium (II) sulfate, and the like, as well as combinations thereof. Likewise, illustrative and non-limiting examples of chromium (III) compounds can include a chromium (III) carboxylate, a chromium (III) naphthenate, a chromium (III) halide, chromium (III) sulfate, chromium (III) nitrate, a chromium (III) dionate, and the like, as well as combinations thereof. In some aspects, the chromium-containing compound can comprise chromium (III) acetate, chromium (III) acetylacetonate, chromium (III) chloride, chromium (III) bromide, chromium (III) sulfate, chromium (III) nitrate, and the like, as well combinations thereof.

While not required, it can be beneficial for the chromium-containing compound to be soluble in a hydrocarbon solvent during catalyst preparation. In such situations, the chromium-containing compound can comprise tertiary butyl chromate, a diarene chromium (0) compound, bis-cyclopentadienyl chromium (II), chromium (III) acetylacetonate, chromium acetate, and the like, or any combination thereof. Similarly, and not required, it can be beneficial for the chromium-containing compound to be soluble in water during catalyst preparation. In such situations, the chromium-containing compound can comprise chromium trioxide, chromium acetate, chromium nitrate, and the like, or any combination thereof.

Additionally, any suitable solid oxide can be used as a solid support for the supported chromium catalyst. Generally, the solid oxide can comprise oxygen and one or more elements selected from Group 2, 3, 4, 5, 6, 7, 8, 9, 10, 11, 12, 13, 14, or 15 of the periodic table, or comprise oxygen and one or more elements selected from the lanthanide or actinide elements (See: Hawley's Condensed Chemical Dictionary, 11$^{th}$ Ed., John Wiley & Sons, 1995; Cotton, F. A., Wilkinson, G., Murillo, C. A., and Bochmann, M., Advanced Inorganic Chemistry, 6$^{th}$ Ed., Wiley-Interscience, 1999). For example, the solid oxide can comprise oxygen and an element, or elements, selected from Al, B, Be, Bi, Cd, Co, Cr, Cu, Fe, Ga, La, Mn, Mo, Ni, Sb, Si, Sn, Sr, Th, Ti, V, W, P, Y, Zn, and Zr. Illustrative examples of solid oxide materials or compounds that can be used as solid support can include, but are not limited to, $Al_2O_3$, $B_2O_3$, BeO, $Bi_2O_3$, CdO, $Co_3O_4$, $Cr_2O_3$, CuO, $Fe_2O_3$, $Ga_2O_3$, $La_2O_3$, $Mn_2O_3$, $MoO_3$, NiO, $P_2O_5$, $Sb_2O_5$, $SiO_2$, $SnO_2$, SrO, $ThO_2$, $TiO_2$, $V_2O_5$, $WO_3$, $Y_2O_3$, ZnO, $ZrO_2$, and the like, including mixed oxides thereof, and combinations thereof.

The solid oxide can encompass oxide materials such as silica, "mixed oxide" compounds thereof such as silica-titania, and combinations or mixtures of more than one solid oxide material. Mixed oxides such as silica-titania can be single or multiple chemical phases with more than one metal combined with oxygen to form the solid oxide. Examples of mixed oxides that can be used as solid oxide include, but are not limited to, silica-alumina, silica-coated alumina, silica-titania, silica-zirconia, alumina-titania, alumina-zirconia, zinc-aluminate, alumina-boria, silica-boria, aluminum phosphate, aluminophosphate, aluminophosphate-silica, titania-zirconia, and the like, or a combination thereof. In some aspects, the solid support can comprise silica, silica-alumina, silica-coated alumina, silica-titania, silica-titania-magnesia, silica-zirconia, silica-magnesia, silica-boria, aluminophosphate-silica, and the like, or any combination thereof. Silica-coated aluminas are encompassed herein; such oxide materials are described in, for example, U.S. Pat. No. 7,884,163, the disclosure of which is incorporated herein by reference in its entirety.

The percentage of each oxide in a mixed oxide can vary depending upon the respective oxide materials. As an example, a silica-alumina typically has an alumina content from 5 wt. % to 95 wt. %. According to one aspect, the alumina content of the silica-alumina can be from 5 wt. % alumina 50 wt. % alumina, or from 8 wt. % to 30 wt. % alumina. In another aspect, high alumina content silica-alumina compounds can be employed, in which the alumina content of these silica-alumina materials typically ranges from 60 wt. % alumina to 90 wt. % alumina, or from 65 wt. % alumina to 80 wt. % alumina.

In one aspect, the solid oxide can comprise silica-alumina, silica-coated alumina, silica-titania, silica-zirconia, alumina-titania, alumina-zirconia, zinc-aluminate, alumina-boria, silica-boria, aluminum phosphate, aluminophosphate, aluminophosphate-silica, titania-zirconia, or a combination thereof alternatively, silica-alumina; alternatively, silica-coated alumina; alternatively, silica-titania; alternatively, silica-zirconia; alternatively, alumina-titania; alternatively, alumina-zirconia; alternatively, zinc-aluminate; alternatively, alumina-boria; alternatively, silica-boria; alternatively, aluminum phosphate; alternatively, aluminophosphate; alternatively, aluminophosphate-silica; or alternatively, titania-zirconia.

In another aspect, the solid oxide can comprise silica, alumina, titania, zirconia, magnesia, boria, zinc oxide, a mixed oxide thereof, or any mixture thereof. In yet another aspect, the solid support can comprise silica, alumina, titania, or a combination thereof; alternatively, silica; alternatively, alumina; alternatively, titania; alternatively, zirconia; alternatively, magnesia; alternatively, boria; or alternatively, zinc oxide. In still another aspect, the solid oxide can comprise silica, alumina, silica-alumina, silica-coated alumina, aluminum phosphate, aluminophosphate, heteropolytungstate, titania, zirconia, magnesia, boria, zinc oxide, silica-titania, silica-zirconia, alumina-titania, alumina-zirconia, zinc-aluminate, alumina-boria, silica-boria, aluminophosphate-silica, titania-zirconia, and the like, or any combination thereof.

The methods of reduction via irradiation that are disclosed herein can further comprise a step of calcining to form the supported chromium catalyst containing chromium in the hexavalent oxidation state. The calcination step can be conducted at a variety of temperatures and time periods, which are generally selected to convert all or a portion of the chromium to hexavalent chromium. Often, the calcination is performed in an oxidizing atmosphere, but this is not a requirement.

For instance, the calcination step can be conducted at a peak temperature in a range from about 300° C. to about 1000° C.; alternatively, from about 500° C. to about 900° C.; alternatively, from about 600° C. to about 871° C.; alternatively, from about 550° C. to about 870° C.; alternatively, from about 700° C. to about 850° C.; alternatively, from about 725° C. to about 900° C.; alternatively, from about 725° C. to about 871° C.; alternatively, from about 725° C. to about 850° C.; alternatively, from about 750° C. to about 871° C.; or alternatively, from about 750° C. to about 850° C.

The duration of the calcination step is not limited to any particular period of time. Hence, this calcination step can be conducted, for example, in a time period ranging from as little as 1 minute to as long as 12-24 hours, or more. In certain aspects, the calcination step can be conducted for a time period of from about 1 min to about 24 hr, from about 1 hr to about 12 hr, or from about 30 min to about 8 hr. The appropriate calcination time can depend upon, for example, the initial/peak temperature, among other variables.

While not being limited thereto, the supported chromium catalyst often can comprise chromium/silica, chromium/silica-titania, chromium/silica-titania-magnesia, chromium/silica-alumina, chromium/silica-coated alumina, chromium/aluminophosphate, and the like, or any combination thereof. In one aspect, the supported chromium catalyst can comprise chromium/silica, while in another aspect, the supported chromium catalyst can comprise chromium/silica-titania. In yet another aspect, the supported chromium catalyst can comprise chromium/silica-titania-magnesia; alternatively, chromium/silica-alumina; alternatively, chromium/silica-coated alumina; or alternatively, chromium/aluminophosphate.

Suitable modifications to the supported chromium catalyst also are contemplated herein, and can include treatment with an electron-withdrawing anion and/or a metal compound. Additionally, the supported chromium compound can be subjected to the modifications at any time during or after its preparation. For instance, in certain aspects, the solid support can be modified prior to impregnation with a chromium compound and/or a calcining step. In other aspects, the supported chromium compound may be subjected to suitable modifications following a calcination step. In certain aspects, modifications can include supported chromium catalysts, or components thereof, that have been fluorided, chlorided, bromided, sulfated, or phosphated, and/or those that have been impregnated with metal ions (e.g., zinc, nickel, vanadium, titanium (titanated), silver, copper, gallium, tin, tungsten, molybdenum, zirconium, and the like, or combinations thereof).

Supported chromium catalysts that are treated with light as described herein, and the resultant reduced chromium catalysts, can have any suitable pore volume, surface area, and particle size. In certain aspects, the supported chromium catalyst (or the reduced chromium catalyst) can have a pore volume (total pore volume) in a range from about 0.5 to about 5 mL/g, from about 1 to about 5 mL/g, from about 0.9 to about 3 mL/g, or from about 1.2 to about 2.5 mL/g. The surface area of the catalyst is not limited to any particular range, and in certain aspects, the supported chromium catalyst (or the reduced chromium catalyst) can have a BET surface area in a range from about 100 to about 1000 m$^2$/g, from about 200 to about 700 m$^2$/g, from about 100 to about 600 m$^2$/g, from about 250 to about 600 m$^2$/g, from about 250 to about 550 m$^2$/g, or from about 275 to about 525 m$^2$/g. Illustrative and non-limiting ranges for the average ($d_{50}$) particle size of the supported chromium catalyst (or the reduced chromium catalyst) can include from about 10 to about 500 microns, from about 25 to about 250 microns, from about 40 to about 160 microns, or from about 40 to about 120 microns. BET surface areas are determined using the BET nitrogen adsorption method of Brunauer et al., *J. Am. Chem. Soc.*, 60, 309 (1938). Total pore volumes are determined in accordance with Halsey, G. D., *J. Chem. Phys.* (1948), 16, pp. 931. The d50 particle size, or median or average particle size, refers to the particle size for which 50% of the sample has a smaller size and 50% of the sample has a larger size, and is determined using laser diffraction in accordance with ISO 13320.

The amount of chromium in the supported chromium catalyst (or the reduced chromium catalyst) is not particularly limited. Generally, however, the amount of chromium in the supported chromium catalyst (or the reduced chromium catalyst) can range from about 0.01 to about 20 wt. %; alternatively, from about 0.1 to about 15 wt. %; alternatively, from about 0.1 to about 10 wt. %; alternatively, from about 0.2 to about 5 wt. %; alternatively, from about 0.2 to about 2.5 wt. %; alternatively, from about 0.5 to about 10 wt. %; or alternatively, from about 1 to about 6 wt. %. These weight percentages are based on the amount of chromium relative to the total weight of the respective catalyst.

Similarly, before the reduction treatment, the supported the supported chromium catalyst can have any suitable amount of chromium in its hexavalent state, relative to the total amount of chromium in the supported chromium catalyst. In certain aspects, the portion of the chromium of the supported chromium catalyst in the hexavalent oxidation state can be at least about 10 wt. %, at least about 20 wt. %, at least about 40 wt. %, at least about 60 wt. %, at least about 80 wt. %, at least about 90 wt. %, at least about 95 wt. %, or at least about 99 wt. %, prior to irradiation. Thus, in some aspects, before the reduction treatment, the amount of chromium (VI) in the supported chromium catalyst can range from about 0.01 to about 20 wt. %; alternatively, from about 0.1 to about 15 wt. %; alternatively, from about 0.1 to about 10 wt. %; alternatively, from about 0.2 to about 5 wt. %; alternatively, from about 0.2 to about 2.5 wt. %; alternatively, from about 0.5 to about 10 wt. %; or alternatively, from about 1 to about 6 wt. %. These weight percentages are based on the amount of chromium (VI) relative to the total weight of the supported chromium catalyst.

Generally, the irradiating step can be performed under any conditions sufficient to accommodate the irradiation of the reductant and the supported hexavalent chromium catalyst with a light beam and to form the reduced chromium catalyst (having a lower oxidation state). For instance, the relative amount (or concentration) of the reductant to the amount of chromium (in the support chromium catalyst) can alter the efficacy of the reduction process. In certain aspects, the molar ratio of the reductant to the chromium (in the supported chromium catalyst) can be at least about 0.25:1, at least about 0.5:1, at least about 1:1, at least about 10:1, at least about 100:1, at least about 1000:1, or at least about 10,000:1. Thus, a large excess of the reductant case be used, and there is no particular limit as to the maximum amount of reductant.

Any reductants and/or diluents used in the irradiation methods disclosed herein can be chosen based on their suitability for downstream olefin polymerization reactions. In one aspect, the reductant and the supported chromium catalyst are irradiated at any suitable pressure, and the reductant is a diluent (or carrier) for the solid catalyst. Clearly, in such circumstances, a large excess of reductant exists. In another aspect, a mixture of the reductant and the supported chromium catalyst in a diluent is irradiated at any suitable pressure. In such circumstances, the reductant can be present in much lower amounts. Thus, the reductant can be separate from the diluent, or the reductant can be the diluent. In either case, the diluent can be chosen based on its utility and suitability to any of the olefin polymerizations process described herein. Suitable diluents therefore can include certain olefin monomers and comonomers and/or hydrocarbon solvents that are liquids under conditions appropriate for reduction via irradiation and/or for subsequent olefin polymerization. Non-limiting examples of suitable hydrocarbon diluents that can be suitable as reductants can include, propane, isobutane, n-butane, n-pentane, isopentane, neopentane, n-hexane, heptane, octane, cyclohexane, cycloheptane, methylcyclohexane, methylcycloheptane, adamantane, decalin, ethylene, propylene, 1-butene, 1-hexene, 1-octene, 1-decene, benzene, toluene, cyclohexene, xylene, ethylbenzene, and the like, or combinations thereof.

The temperature and pressure of the irradiating step can be such that the reductant and/or diluent remain(s) a liquid throughout reduction of the chromium catalyst. Advantageously, it was found that reducing supported chromium compounds at lower temperatures than those typically required to reduce hexavalent chromium species using heat and not light, was possible by the irradiating steps disclosed herein. In certain aspects, the irradiating step can be conducted at a temperature of less than about 200° C., less than about 100° C., less than about 150° C., less than about 40° C., from about 0° C. to about 200° C., from about 0° C. to about 100° C., or from about 10° C. to about 40° C., and can produce a reduced chromium catalyst with excellent properties for subsequent olefin polymerizations.

Generally, reductants suitable for the present invention can be any that are capable of reducing at least a portion of the supported chromium compound upon exposure to light as described herein. In one aspect, the reductant can be present in the liquid phase, while in another aspect, the reductant can be present in the gas phase. Reductants (one or more than one in combination) contemplated herein can encompass any compound comprising a C—H and/or H—H bond (H$_2$). In certain aspects, the reductant can comprise one or more C—C bonds of any order (e.g., a single bond, a double bond, a triple bond) such that almost any saturated or unsaturated hydrocarbon compound, containing exclusively C—H and C—C bond bonds, can be suitable as a reductant for the methods, processes, and systems disclosed herein. In certain aspects, the reductant can comprise a $C_1$ to $C_{36}$ hydrocarbon, a $C_1$ to $C_{18}$ hydrocarbon, a $C_1$ to $C_{12}$ hydrocarbon, and/or a $C_1$ to $C_8$ hydrocarbon. Additionally, reductants contemplated herein can comprise a substituted and/or unsubstituted hydrocarbon compound. In one aspect, the reductant can comprise an alkane, an olefin, an aromatic, or any combination thereof (e.g., a $C_1$ to $C_{36}$ alkane, olefin, and/or aromatic (up to 36 carbon atoms); a $C_1$ to $C_{18}$ alkane, olefin, and/or aromatic (up to 18 carbon atoms); a $C_1$ to $C_{12}$ alkane, olefin, and/or aromatic (up to 12 carbon atoms); or a $C_1$ to $C_8$ alkane, olefin, and/or aromatic (up to 8 carbon atoms)). The alkane can be a linear alkane, a branched alkane, or a cyclic alkane. In another aspect, the reductant can comprise ethylene, 1-butene, 1-hexene, 1-octene, methane, ethane, propane, isobutane, n-pentane, isopentane, n-hexane, tetrafluoroethane, cyclohexane, adamantane, decalin, benzene, toluene, and the like, or any combination thereof. In yet another aspect, the reductant can comprise a halogenated hydrocarbon (halogenated alkane, halogenated aromatic), where one or more halogen atoms replaces an equivalent number of hydrogen atoms in the hydrocarbon, provided that the compound contains a C—H bond.

The irradiating step may be further characterized by an amount of time that the reductant and supported chromium catalyst are exposed to the light beam, e.g., an exposure time. Without being bound by theory, it is believed that exposure to the light beam in the presence of a reductant is responsible for the reduction of the chromium catalyst, and therefore it follows that the exposure time must be sufficient to allow this transformation to occur, whether the transformation occurs very rapidly or very slowly. Thus, in certain aspects, the exposure time can be in a range from about 15 sec to about 10 hr, from about 1 min to about 6 hr, from about 5 min to about 1 hr, from about 10 min to about 2 hr, from about 1 min to about 1 hr, or from about 1 min to about 15 min. As one of skill in the art would recognize, the exposure time can vary based on the intensity of the light beam.

However, it was unexpectedly determined in the examples that follow, that limiting the exposure time can be advantageous, which can form reduced chromium catalysts with increased catalytic activity and can produce olefin polymers having improved melt index potential as compared to chromium catalysts that underwent longer exposure times. In certain aspects, the exposure time can be less than about 1 min, less than about 5 min, less than about 10 min, less than about 15 min, less than about 30 min, less than about 1 hr, less than about 2 hr, or less than about 4 hr.

In the disclosed methods, irradiation of a supported chromium catalyst sample with a light beam in the UV-visible spectrum, in the presence of a reductant, results in a chromium catalyst with a reduced oxidation state. A wide range of wavelengths, light sources, and intensities can be used, as long as these wavelengths, light sources, and intensities are sufficient to reduce at least a portion of the hexavalent chromium species present in the supported chromium catalyst. In certain aspects, for instance, the light can be derived from any suitable source, such as from sunlight, a fluorescent white light, an LED diode, and/or a UV lamp. The distance from non-sunlight sources can be varied as needed (e.g., minimized) to increase the effectiveness of the irradiation.

The wavelength of the light can be any in the range of UV-visible light. In certain aspects, the wavelength of the light beam can be a single wavelength, or more than one wavelength, such as a range of wavelengths. For instance, the wavelength of the light beam can be a range of wavelengths spanning at least 25 nm, at least 50 nm, at least 100 nm, at least 200 nm, or at least 300 nm. In one aspect, the wavelength of the light beam can comprise a single wavelength or a range of wavelengths in the UV spectrum, in the visible spectrum (from 380 nm to 780 nm), or both. In another aspect, the wavelength of the light beam can comprise a single wavelength or a range of wavelengths in the 200 nm to 750 nm range. Yet, in another aspect, the wavelength of the light beam can comprise a single wavelength or a range of wavelengths in the 300 to 750 nm range, the 350 nm to 650 nm range, the 300 nm to 600 nm range, the 300 nm to 500 nm range, or the 300 nm to 400 nm range. In other aspects, the wavelength of the light beam can comprise a single wavelength or a range of wavelengths below 600 nm, below 525 nm, or below 500 nm; additionally or alternatively, above 350 nm, above 400 nm, or above 450 nm.

The light beam of the irradiating step also can be characterized by its intensity (e.g., the total amount of light emitted from a source). In certain aspects, the light beam can have an intensity of at least about 500 lumens, at least about 1,000 lumens, at least about 2,000 lumens at least about 5,000 lumens, at least about 10,000 lumens, at least about 20,000 lumens, at least about 50,000 lumens, or at least about 100,000 lumens. Thus, there may not be an upper limit on the intensity of the light source. Alternatively, the light beam can have an intensity in a range from about 50 to about 50,000 lumens, from about 50 to about 10,000 lumens, from about 100 to about 5,000 lumens, or from about 500 to about 2,000 lumens. Additionally, the light beam can be characterized by the amount of light reaching the reductant and supported chromium catalyst, i.e., the flux. In certain aspects, the reductant and the supported chromium catalyst comprising chromium in the hexavalent oxidation state can be irradiated by at least about 100 lux, at least about 500 lux, at least about 1000 lux, at least about 2000 lux, at least about 5000 lux, at least about 10,000 lux, at least about 20,000 lux, at least about 100,000 lux, or in a range from about 10,000 to about 1,000,000 lux, from about 50,000 to about 500,000 lux, or about 50,000 to about 200,000 lux. Additionally or alternatively, in certain aspects, the reductant and the supported chromium catalyst comprising chromium in the hexavalent oxidation state can be irradiated with a light beam having a power of at least about 50 watts, at least about 100 watts, at least about 200 watts, at least about 500 watts, at least about 1,000 watts, or at least about 2,000 watts.

The efficacy of the methods of reduction via irradiation that are disclosed herein can be characterized by the chemical composition of the reduced chromium catalyst, as compared to the supported chromium catalyst starting material. In particular, the reduced chromium catalysts can have a significant portion of the chromium species from the supported chromium catalyst reduced during the irradiation step, and can have high catalytic activity. In certain aspects, at least about 10 wt. %, at least about 20 wt. %, at least about 40 wt. %, at least about 60 wt. %, at least about 80 wt. %, at least about 90 wt. %, at least about 95 wt. %, or at least about 99 wt. %, of the supported chromium catalyst (or the hexavalent species in the supported chromium catalyst) can be reduced to form the reduced chromium catalyst.

Thus, in the reduced chromium catalyst, less than or equal to about 75 wt. % of the chromium can be in the hexavalent state in one aspect, while less than or equal to about 50 wt. % of the chromium can be in the hexavalent state in another aspect, and less than or equal to about 40 wt. % of the chromium can be in the hexavalent state in yet another aspect, and less than or equal to about 30 wt. % of the chromium can be in the hexavalent state in still another aspect. These values are based on the total amount of chromium in the reduced chromium catalyst.

Additionally or alternatively, the chromium in the reduced chromium catalyst can be characterized by an average valence of less than or equal to about 5.25. More often, the chromium in the reduced chromium catalyst has an average valence of less than or equal to about 5; alternatively, an average valence of less than or equal to about 4.75; alternatively, an average valence of less than or equal to about 4.5; alternatively, an average valence of less than or equal to about 4.25; or alternatively, an average valence of less than or equal to about 4.

Additionally, the efficacy of the methods disclosed herein can be characterized by the relative activity of the reduced chromium catalyst in an olefin polymerization reaction. In certain aspects, the reduced chromium catalyst can have a catalyst activity greater (e.g., at least 10%, at least 20%, at least 50%, at least 80%, etc., greater) than that of the supported chromium catalyst (which has no light irradiation treatment, or exposure to light but with no reductant present, etc.). Additionally or alternatively, the reduced chromium catalyst (via irradiation with a reductant) can be compared to an otherwise identical catalyst—calcined with the same temperature and procedure—but then treated with the same reductant at an elevated temperature (e.g., 300° C., 350° C., 400° C., 450° C., or 500° C.) so as to cause reduction from thermal means in the absence of light. Thus, the reduced chromium catalyst can have a catalyst activity greater (e.g., at least 10%, at least 20%, at least 50%, at least 80%, etc., greater) than that of an otherwise identical catalyst prepared using the same reductant at an elevated temperature without light irradiation. These activity comparisons are under the same polymerization conditions, which are slurry polymerization conditions at a temperature of 105° C. and a pressure of 550 psig.

Catalyst Preparation Systems

In another aspect of this invention, a catalyst preparation system is provided, and in this aspect, the catalyst preparation system can comprise (a) a catalyst preparation vessel configured to irradiate a slurry of a supported chromium catalyst in a diluent with a light beam at a wavelength in the UV-visible spectrum, (b) a catalyst inlet configured to introduce the slurry of the supported chromium catalyst into the catalyst preparation vessel, wherein at least a portion of the chromium is in the hexavalent oxidation state, and (c) a reduced catalyst outlet configured to withdraw a slurry of a reduced chromium catalyst from the catalyst preparation vessel.

Generally, the features of any of the catalyst preparation systems disclosed herein (e.g., the catalyst preparation vessel, the light beam, the catalyst inlet, and the reduced catalyst outlet, among others) are independently described herein, and these features can be combined in any combination to further describe the disclosed catalyst preparation systems. Moreover, other devices or catalyst preparation system components can be present in the disclosed catalyst preparation systems, unless stated otherwise. For instance, the catalyst preparation system can further include a co-catalyst inlet configured to introduce any suitable co-catalyst feed stream into the catalyst preparation vessel. Additionally or alternatively, the catalyst preparation system can further include a reductant inlet configured to introduce any suitable reductant feed stream into the catalyst preparation vessel. Thus, the reductant can be fed separately to the catalyst preparation vessel. Additionally or alternatively, the diluent can contain the reductant, or the diluent can be the reductant.

The catalyst preparation system can be configured to operate in a continuous manner, for instance, to provide a continuous feed stream of the reduced chromium catalyst to a polymerization reactor via the reduced catalyst outlet of the catalyst preparation system. Alternatively, the catalyst preparation system can be configured for batchwise production. Indeed, the catalyst preparation vessel itself is not limited to any particular type, and typically can be a stirred tank, a flow reactor vessel, or other suitable tank or vessel. The catalyst preparation vessel can be configured to operate at any temperature and pressure suitable for irradiating the slurry of the chromium catalyst.

Whether configured for batchwise or continuous production, the catalyst preparation system can be configured for any residence time sufficient to irradiate the slurry of the supported chromium catalyst, while also supplying a sufficient amount of the reduced catalyst to any downstream or subsequent process, e.g., a polymerization process. Suitable residence times can be the same or different from (e.g., longer than) the exposure times disclosed hereinabove for the irradiating step of the methods for reducing a chromium catalyst. In certain aspects, the system can be configured for a residence time of from about 15 sec to about 10 hr, from about 1 min to about 6 hr, from about 5 min to about 1 hr, from about 10 min to about 2 hr, from about 1 min to about 1 hr, or from about 1 min to about 15 min.

Encompassed herein are aspects of this invention in which the source of the light beam is sunlight. However, in aspects where the light source is an artificial light source, e.g., a UV lamp, a fluorescent white light, and/or an LED diode, the catalyst preparation system can further comprise a lamp assembly to house the light source and facilitate irradiation of the supported chromium catalyst within the catalyst preparation vessel. The lamp assembly can be inside of, or outside of, the catalyst preparation vessel. For a lamp assembly inside the catalyst preparation vessel, the lamp assembly can be positioned within the reaction space of the vessel, such that the slurry comprising the supported chromium catalyst and the diluent (which can be the reductant) or the slurry, diluent, and reductant, can flow around the lamp assembly, which can be housed within a quartz tube or other suitable barrier to shield the lamp from direct contact with the slurry and the solid chromium catalyst. A non-limiting example of this configuration is shown in U.S. Patent Publication No. 2014/0221692, directed to flow reactor vessels and reactor systems, incorporated herein by reference in its entirety.

Alternatively, the lamp assembly can be positioned outside of the catalyst preparation vessel. Thus, the catalyst preparation vessel can comprise a window or screen to allow light emitted from the lamp to pass into the catalyst preparation vessel and irradiate (e.g., reduce) the supported chromium catalyst and reductant therein. The lamp assembly can be configured to emit a light beam at any wavelength or range of wavelengths in the UV-visible spectrum, as disclosed hereinabove for the irradiating step of the methods for reducing a chromium catalyst.

The catalyst preparation system can further comprise (d) a controller that is configured to control the residence time of the supported chromium catalyst in the catalyst preparation vessel, and/or the temperature of the catalyst preparation vessel, and/or the intensity of the light beam, and/or the wavelength of the light beam, and/or the amount of the reduced chromium catalyst, and/or the molar ratio of the reductant to chromium. The controller also can be configured to control a flow rate of the slurry entering the catalyst inlet and the flow rate exiting the reduced catalyst outlet. If a co-catalyst is fed to the catalyst preparation vessel, the controller can be further configured to control a flow rate of the co-catalyst feed stream. Similarly, if a reductant is fed to the catalyst preparation vessel (and separate from the diluent), the controller can be further configured to control a flow rate of the reductant feed stream entering the catalyst preparation vessel.

As a non-limiting example, if the molar ratio of the reductant to chromium in the catalyst preparation vessel is below a target value (i.e., too low), then the controller can decrease the flow rate of the slurry (containing the supported chromium catalyst) entering the vessel and/or increase the flow rate of the reductant feed stream entering the vessel.

A representative catalyst preparation system consistent with aspects of this invention is illustrated in FIG. 1. The catalyst preparation system 100 includes a catalyst preparation vessel 110, a supported chromium catalyst inlet 101, and a reduced catalyst outlet 115. A reactor 120 also is shown in FIG. 1 to demonstrate that the catalyst preparation systems disclosed herein can be integrated as part of a polymerization reactor system, such as any of those described herein. The catalyst preparation system 100 also includes co-catalyst inlet 103 configured to introduce a co-catalyst feed stream into the catalyst preparation vessel (if desired), and a reductant inlet 105 to introduce a reductant feed stream into the catalyst preparation vessel (if desired). Alternatively, the reductant can be present in the supported chromium catalyst feed stream, entering the vessel 110 via inlet 101. Additional inlets and feed streams to the catalyst preparation vessel also can be present, though separate feed streams to the catalyst preparation vessel are not shown. Lamp assembly 130 is shown as positioned inside or outside the catalyst preparation vessel, and able to irradiate within vessel 110. FIG. 1 also shows a process parameter 132 (e.g., temperature, residence time, relative amount of reductant, etc.) from the catalyst preparation vessel 110 can be relayed to a measurement system 140 for determination of various process and operating conditions within vessel 110. A process parameter 134 from the reduced catalyst outlet 115 (e.g., flow rate, amount of reduced catalyst, etc.), and/or a process parameter 136 from the reactor 120, can be submitted to the measurement system 140.

Information or data 145 from the measurement system 140 can be provided to controller 150, which can then control or adjust 155 a flow rate of material within any of inlet 101, inlet 103, inlet 105, and outlet 115. Alternatively, or additionally, controller 150 can independently control or adjust 155 various process or operating conditions—e.g., the temperature, the residence time, the relative amount of reductant, the light intensity, the light wavelength, etc.—of the catalyst preparation vessel 110.

Polymerization Reactor Systems and Processes

Encompassed herein are polymerization reactor systems, and in an aspect of this invention, the polymerization reactor systems can comprise any of the catalyst preparation systems disclosed herein, and a reactor configured to contact the reduced chromium catalyst with an olefin monomer and an optional olefin comonomer under polymerization conditions to produce an olefin polymer. Polymerization processes also are encompassed herein, and in another aspect of this invention, the polymerization process can comprise (I) irradiating a reductant and a supported chromium catalyst comprising chromium in the hexavalent oxidation state with a light beam at a wavelength in the UV-visible spectrum to reduce at least a portion of the supported chromium catalyst to form a reduced chromium catalyst, and (II) contacting any reduced chromium catalyst disclosed herein (e.g., a reduced chromium catalyst prepared by any method for reducing chromium catalysts disclosed above) and an optional co-catalyst with an olefin monomer and an optional olefin comonomer in a polymerization reactor system under polymerization conditions to produce an olefin polymer. Any of the features of step (I) can be the same as those described herein (e.g., the reductant, the source of the light beam, the wavelength, etc.) for the methods of reducing a supported chromium catalyst.

Beneficially, employing the irradiation step to form the reduced catalyst (prior to initiating polymerization) can result in a more fully activated catalyst, which has been reduced and alkylated, before entering the polymerization reactor. The resulting overall activity increase (the catalyst no longer requires reduction/alkylation after entering the polymerization reactor) can allow for the use of less catalyst and lower polymerization temperatures, which in turn can reduce polymer swelling and fouling, and improve overall operating efficiency.

Unsaturated monomers that can be employed with catalyst compositions and polymerization processes of this invention typically can include olefin compounds having from 2 to 30 carbon atoms per molecule and having at least one olefinic double bond. This invention encompasses homopolymerization processes using a single olefin such as ethylene or propylene, as well as copolymerization, terpolymerization, etc., reactions using an olefin monomer with at least one different olefinic compound. For example, the resultant ethylene copolymers, terpolymers, etc., generally can contain a major amount of ethylene (>50 mole percent) and a minor amount of comonomer (<50 mole percent), though this is not a requirement. Comonomers that can be copolymerized with ethylene often can have from 3 to 20 carbon atoms, or from 3 to 10 carbon atoms, in their molecular chain.

Acyclic, cyclic, polycyclic, terminal (a), internal, linear, branched, substituted, unsubstituted, functionalized, and non-functionalized olefins can be employed in this invention. For example, typical unsaturated compounds that can be polymerized with the catalyst compositions of this invention can include, but are not limited to, ethylene, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-hexene, 3-ethyl-1-hexene, 1-heptene, 2-heptene, 3-heptene, the four normal octenes (e.g., 1-octene), the four normal nonenes, the five normal decenes, and the like, or mixtures of two or more of these compounds. Cyclic and bicyclic olefins, including but not limited to, cyclopentene, cyclohexene, norbornylene, norbornadiene, and the like, also can be polymerized as described herein. Styrene can also be employed as a monomer in the present invention. In an aspect, the olefin monomer can comprise a $C_2$-$C_{20}$ olefin; alternatively, a $C_2$-$C_{20}$ alpha-olefin; alternatively, a $C_2$-$C_{10}$ olefin; alternatively, a $C_2$-$C_{10}$ alpha-olefin; alternatively, the olefin monomer can comprise ethylene; or alternatively, the olefin monomer can comprise propylene.

When a copolymer (or alternatively, a terpolymer) is desired, the olefin monomer and the olefin comonomer independently can comprise, for example, a $C_2$-$C_{20}$ alpha-olefin. In some aspects, the olefin monomer can comprise ethylene or propylene, which is copolymerized with at least one comonomer (e.g., a $C_2$-$C_{20}$ alpha-olefin, a $C_3$-$C_{20}$ alpha-olefin, etc.). According to one aspect of this invention, the olefin monomer used in the polymerization process can comprise ethylene. In this aspect, examples of suitable olefin comonomers can include, but are not limited to, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-ethyl-1-hexene, 1-heptene, 2-heptene, 3-heptene, 1-octene, 1-decene, styrene, and the like, or combinations thereof. According to another aspect of the present invention, the olefin monomer can comprise ethylene, and the comonomer can comprise a $C_3$-$C_{10}$ alpha-olefin; alternatively, the comonomer can comprise 1-butene, 1-pentene, 1-hexene, 1-octene, 1-decene, styrene, or any combination thereof; alternatively, the comonomer can comprise 1-butene, 1-hexene, 1-octene, or any combination thereof; alternatively, the comonomer can comprise 1-butene; alternatively, the comonomer can comprise 1-hexene; or alternatively, the comonomer can comprise 1-octene.

The chromium catalysts of the present invention are intended for any olefin polymerization method using various types of polymerization reactor systems and reactors. The polymerization reactor system can include any polymerization reactor capable of polymerizing olefin monomers and comonomers (one or more than one comonomer) to produce homopolymers, copolymers, terpolymers, and the like. The various types of reactors include those that can be referred to as a batch reactor, slurry reactor, gas-phase reactor, solution reactor, high pressure reactor, tubular reactor, autoclave reactor, and the like, or combinations thereof. The polymerization conditions for the various reactor types are well known to those of skill in the art. Gas phase reactors can comprise fluidized bed reactors or staged horizontal reactors. Slurry reactors can comprise vertical or horizontal loops. High pressure reactors can comprise autoclave or tubular reactors. These reactor types generally can be operated continuously. Continuous processes can use intermittent or continuous polymer product discharge. Polymerization reactor systems and processes also can include partial or full direct recycle of unreacted monomer, unreacted comonomer, and/or diluent (e.g., the same or different from the diluent used during reduction of the chromium catalyst).

Polymerization reactor systems of the present invention can comprise one type of reactor in a system or multiple reactors of the same or different type (e.g., a single reactor, dual reactor, more than two reactors). For instance, the polymerization reactor system can comprise a solution reactor, a gas-phase reactor, a slurry reactor, or a combination of two or more of these reactors. Production of polymers in multiple reactors can include several stages in at least two separate polymerization reactors interconnected by a transfer device making it possible to transfer the polymer resulting from the first polymerization reactor into the second reactor. The polymerization conditions in one of the reactors can be different from the operating conditions of the other reactor(s). Alternatively, polymerization in multiple reactors can include the manual transfer of polymer from one reactor to subsequent reactors for continued polymerization. Multiple reactor systems can include any combination including, but not limited to, multiple loop reactors, multiple gas phase reactors, a combination of loop and gas phase reactors, multiple high pressure reactors, or a combination of high pressure with loop and/or gas phase reactors. The multiple reactors can be operated in series, in parallel, or both. Accordingly, the present invention encompasses polymerization reactor systems comprising a single reactor, comprising two reactors, and comprising more than two reactors. The polymerization reactor system can comprise a slurry reactor, a gas-phase reactor, a solution reactor, in certain aspects of this invention, as well as multi-reactor combinations thereof.

According to one aspect, the polymerization reactor system can comprise at least one loop slurry reactor, e.g., comprising vertical or horizontal loops. Monomer, diluent, catalyst, and optional comonomer can be continuously fed to a loop reactor where polymerization occurs. Generally, continuous processes can comprise the continuous introduction of monomer/comonomer, a catalyst, and a diluent into a polymerization reactor and the continuous removal from this reactor of a suspension comprising polymer particles and the diluent. Reactor effluent can be flashed to remove the solid polymer from the liquids that comprise the diluent, monomer and/or comonomer. Various technologies can be used for this separation step including, but not limited to, flashing that can include any combination of heat addition and pressure reduction, separation by cyclonic action in either a cyclone or hydrocyclone, or separation by centrifugation.

A typical slurry polymerization process (also known as the particle form process) is disclosed, for example, in U.S. Pat. Nos. 3,248,179, 4,501,885, 5,565,175, 5,575,979, 6,239,235, 6,262,191, 6,833,415, and 8,822,608, each of which is incorporated herein by reference in its entirety.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used, such as can be employed in the bulk polymerization of propylene to form polypropylene homopolymers.

According to yet another aspect, the polymerization reactor system can comprise at least one gas phase reactor (e.g., a fluidized bed reactor). Such reactor systems can employ a continuous recycle stream containing one or more monomers continuously cycled through a fluidized bed in the presence of the catalyst under polymerization conditions. A recycle stream can be withdrawn from the fluidized bed and recycled back into the reactor. Simultaneously, polymer product can be withdrawn from the reactor and new or fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 5,352,749, 4,588,790, 5,436,304, 7,531,606, and 7,598,327, each of which is incorporated by reference in its entirety herein.

According to still another aspect, the polymerization reactor system can comprise a high pressure polymerization reactor, e.g., can comprise a tubular reactor or an autoclave reactor. Tubular reactors can have several zones where fresh monomer, initiators, or catalysts are added. Monomer can be entrained in an inert gaseous stream and introduced at one zone of the reactor. Initiators, catalysts, and/or catalyst components can be entrained in a gaseous stream and introduced at another zone of the reactor. The gas streams can be intermixed for polymerization. Heat and pressure can be employed appropriately in such high pressure polymerization reactors to obtain optimal polymerization reaction conditions.

According to yet another aspect, the polymerization reactor system can comprise a solution polymerization reactor, wherein the monomer/comonomer can be contacted with the catalyst composition by suitable stirring or other means. A carrier comprising an inert organic diluent or excess monomer can be employed. If desired, the monomer/comonomer can be brought in the vapor phase into contact with the catalytic reaction product, in the presence or absence of liquid material. The polymerization zone can be maintained at temperatures (e.g., up to between 150° C. and 180° C.) and pressures that will result in the formation of a solution of the polymer in a reaction medium. Agitation can be employed to obtain better temperature control and to maintain uniform polymerization mixtures throughout the polymerization zone. Adequate means are utilized for dissipating the exothermic heat of polymerization.

In some aspects, the polymerization reactor system can comprise any combination of a raw material feed system, a feed system for catalyst and/or catalyst components, and/or a polymer recovery system, including continuous systems. In other aspects, suitable reactor systems can comprise systems for feedstock purification, catalyst storage and preparation, extrusion, reactor cooling, polymer recovery, fractionation, recycle, storage, loadout, laboratory analysis, and process control, in addition to or as part of the catalyst preparation systems disclosed herein.

The catalyst compositions and/or polymerization processes disclosed herein often can employ a co-catalyst. In some aspects, the co-catalyst can comprise a metal hydrocarbyl compound, examples of which include non-halide metal hydrocarbyl compounds, metal hydrocarbyl halide compounds, non-halide metal alkyl compounds, metal alkyl halide compounds, and so forth, and in which the metal can be any suitable metal, often a group 13 metal. Hence, the metal can be boron or aluminum in certain aspects of this invention, and the co-catalyst can comprise a boron hydrocarbyl or alkyl, or an aluminum hydrocarbyl or alkyl, as well as combinations thereof.

In one aspect, the co-catalyst can comprise an aluminoxane compound, an organoaluminum compound, or an organoboron compound, and this includes combinations of more than co-catalyst compound. Representative and non-limiting examples of aluminoxanes include methylaluminoxane, modified methylaluminoxane, ethylaluminoxane, n-propylaluminoxane, iso-propyl-aluminoxane, n-butylaluminoxane, t-butyl-aluminoxane, sec-butylaluminoxane, iso-butylaluminoxane, 1-pentyl-aluminoxane, 2-pentylaluminoxane, 3-pentyl-aluminoxane, isopentyl-aluminoxane, neopentylaluminoxane, and the like, or any combination thereof. Representative and non-limiting examples of organoaluminums include trimethylaluminum, triethylaluminum, tri-n-propyl aluminum, tri-n-butylaluminum, tri-isobutylaluminum, tri-n-hexylaluminum, tri-n-octylaluminum, diisobutylaluminum hydride, diethylaluminum ethoxide, diethylaluminum chloride, and the like, or any combination thereof. Representative and non-limiting examples of organoborons include tri-n-butyl borane, tripropylborane, triethylborane, and the like, or any combination thereof. Co-catalysts that can be used in the catalyst compositions of this invention are not limited to the co-catalysts described above. Other suitable co-catalysts (such as organomagnesiums and organolithiums) are well known to those of skill in the art including, for example, those disclosed in U.S. Pat. Nos. 3,242,099, 4,794,096, 4,808,561, 5,576,259, 5,807,938, 5,919,983, 7,294,599 7,601,665, 7,884,163, 8,114,946, and 8,309,485, which are incorporated herein by reference in their entirety.

Polymerization conditions that can be monitored, adjusted, and/or controlled for efficiency and to provide desired polymer properties can include, but are not limited to, reactor temperature, reactor pressure, catalyst flow rate into the reactor, monomer flow rate (and comonomer, if employed) into the reactor, monomer concentration in the reactor, olefin polymer output rate, recycle rate, hydrogen flow rate (if employed), reactor cooling status, and the like. Polymerization temperature can affect catalyst productivity, polymer molecular weight, and molecular weight distribution. A suitable polymerization temperature can be any temperature below the de-polymerization temperature according to the Gibbs Free energy equation. Typically, this includes from about 60° C. to about 280° C., for example, from about 60° C. to about 185° C., from about 60° C. to about 120° C., or from about 130° C. to about 180° C., depending upon the type of polymerization reactor, the polymer grade, and so forth. In some reactor systems, the polymerization reactor temperature generally can be within a range from about 70° C. to about 110° C., or from about 125° C. to about 175° C. Various polymerization conditions can be held substantially constant, for example, for the production of a particular grade of olefin polymer.

Suitable pressures will also vary according to the reactor and polymerization type. The pressure for liquid phase polymerizations in a loop reactor typically can be less than 1000 psig (6.9 MPa). The pressure for gas phase polymerization usually can be in the 200 psig to 500 psig range (1.4 MPa to 3.4 MPa). High pressure polymerization in tubular or autoclave reactors generally can be conducted at about 20,000 psig to 75,000 psig (138 MPa to 517 MPa). Polymerization reactors can also be operated in a supercritical region occurring at generally higher temperatures and pressures (for instance, above 92° C. and 700 psig (4.83 MPa)). Operation above the critical point of a pressure/temperature diagram (supercritical phase) can offer advantages to the polymerization reaction process.

Aspects of this invention also are directed to olefin polymerization processes conducted in the absence of added hydrogen. An olefin polymerization process of this invention can comprise contacting a reduced chromium catalyst and an optional co-catalyst with an olefin monomer and optionally an olefin comonomer in a polymerization reactor system under polymerization conditions to produce an olefin polymer, and wherein the polymerization process is conducted in the absence of added hydrogen (no hydrogen is added to the polymerization reactor system). As one of ordinary skill in the art would recognize, hydrogen can be generated in-situ by certain catalyst systems in various olefin polymerization processes, and the amount generated can vary depending upon the specific catalyst components employed, the type of polymerization process used, the polymerization reaction conditions utilized, and so forth.

In other aspects, it may be desirable to conduct the polymerization process in the presence of a certain amount of added hydrogen. Accordingly, an olefin polymerization process of this invention can comprise contacting a reduced chromium catalyst and an optional co-catalyst with an olefin monomer and optionally an olefin comonomer in a polymerization reactor system under polymerization conditions to produce an olefin polymer, wherein the polymerization process is conducted in the presence of added hydrogen (hydrogen is added to the polymerization reactor system). For example, the ratio of hydrogen to the olefin monomer in the polymerization process can be controlled, often by the feed ratio of hydrogen to the olefin monomer entering the reactor. The amount of hydrogen added (based on the amount of olefin monomer) to the process can be controlled at a molar percentage which generally falls within a range from about 0.05 to about 20 mole %, from about 0.1 to about 15 mole %, from about 0.25 to about 10 mole %, or from about 0.5 to about 10 mole %. In some aspects of this invention, the feed or reactant ratio of hydrogen to olefin monomer can be maintained substantially constant during the polymerization run for a particular polymer grade. That is, the hydrogen:olefin monomer ratio can be selected at a particular ratio, and maintained at the ratio to within about +/−25% during the polymerization run. Further, the addition of comonomer (or comonomers) can be, and generally is, substantially constant throughout the polymerization run for a particular polymer grade.

However, in other aspects, it is contemplated that monomer, comonomer (or comonomers), and/or hydrogen can be periodically pulsed to the reactor, for instance, in a manner similar to that employed in U.S. Pat. No. 5,739,220 and U.S. Patent Publication No. 2004/0059070, the disclosures of which are incorporated herein by reference in their entirety.

The concentration of the reactants entering the polymerization reactor system can be controlled to produce resins with certain physical and mechanical properties. The proposed end-use product that will be formed by the polymer resin and the method of forming that product ultimately can determine the desired polymer properties and attributes. Mechanical properties include tensile, flexural, impact, creep, stress relaxation, and hardness tests. Physical properties include density, molecular weight, molecular weight distribution, melting temperature, glass transition temperature, temperature melt of crystallization, density, stereoregularity, crack growth, long chain branching, and rheological measurements.

As discussed above, a representative polymerization reactor system consistent with aspects of this invention is illustrated in FIG. 1. The polymerization reactor system encompasses the catalyst preparation system 100 (comprising a catalyst preparation vessel 110, a lamp assembly 130, a measurement system 140, and a controller 150) and a reactor 120. The catalyst preparation system 100 functions as described above. Process parameters 132, 134, 136 are relayed to the measurement system 140 for determination of various process and operating conditions, and the measurement system 140, therefore, can any encompass any suitable measurement device or equipment (e.g., a flow meter, a thermocouple, etc.) for identifying particular process and operating conditions within catalyst preparation vessel 110, reduced catalyst outlet 115, and/or reactor 120. As above, the polymerization reactor system includes a reduced catalyst outlet 115 configured to withdraw a slurry of a reduced chromium catalyst from catalyst preparation vessel 110 and feed into the reactor 120.

Polymers and Articles

This invention is also directed to, and encompasses, the polymers produced by any of the polymerization processes disclosed herein. Articles of manufacture can be formed from, and/or can comprise, the polymers produced in accordance with this invention.

Olefin polymers encompassed herein can include any polymer produced from any olefin monomer and optional comonomer(s) described herein. For example, the olefin polymer can comprise an ethylene homopolymer, an ethylene copolymer (e.g., ethylene/α-olefin, ethylene/1-butene, ethylene/1-hexene, ethylene/1-octene, etc.), a propylene homopolymer, a propylene copolymer, an ethylene terpolymer, a propylene terpolymer, and the like, including any combinations thereof. In one aspect, the olefin polymer can be an ethylene/1-butene copolymer, an ethylene/1-hexene copolymer, or an ethylene/1-octene copolymer, while in another aspect, the olefin polymer can be an ethylene/1-hexene copolymer.

If the resultant polymer produced in accordance with the present invention is, for example, an ethylene polymer, its properties can be characterized by various analytical techniques known and used in the polyolefin industry. Articles of manufacture can be formed from, and/or can comprise, the olefin polymers (e.g., ethylene polymers) of this invention, whose typical properties are provided below.

An illustrative and non-limiting example of an ethylene polymer (e.g., an ethylene homopolymer and/or ethylene copolymer) consistent with the present invention can have a ratio of Mw/Mn in a range from about 30 to about 110, a ratio of Mz/Mw in a range from about 4 to about 10, and a CY-a parameter in a range from about 0.2 to about 0.4. Other suitable ranges for the ratio of Mw/Mn of the ethylene polymer include from about 35 to about 105, from about 40 to about 100, from about 45 to about 95, or from about 50 to about 90. Likewise, other suitable ranges for the ratio of Mz/Mw include from about 5 to about 9, from about 5 to about 8, from about 5.5 to about 7.5, or from about 6 to about 7. Additionally, other suitable ranges for the CY-a parameter include from about 0.23 to about 0.38, from about 0.25 to about 0.35, or from about 0.27 to about 0.34. Moreover, the ethylene polymer can be further characterized by a Mn in a range from about 3,000 to about 12,000 g/mol, from about 4,000 to about 11,000 g/mol, from about 4,000 to about 10,000 g/mol, from about 5,000 to about 10,000 g/mol, or from about 5,500 to about 9,500 g/mol. Additionally or alternatively, the ethylene polymer can have a Mw in a range from about 250,000 to about 700,000 g/mol, from about 300,000 to about 675,000 g/mol, from about 350,000 to about 625,000 g/mol, or from about 375,000 to about 600,000 g/mol. Additionally or alternatively, the ethylene polymer can have a HLMI of less than or equal to about 10, less than or equal to about 8, less than or equal to about 5, or less than or equal to about 4 g/10 min. Additionally or alternatively, the ethylene polymer can be characterized by a number of long chain branches (LCBs) from about 0.5 to about 4, from about 0.5 to about 3, from about 0.7 to about 2.8, or from about 1 to about 2.5 LCBs per million total carbon atoms.

Another illustrative and non-limiting example of an ethylene polymer consistent with the present invention can have a ratio of Mw/Mn in a range from about 6 to about 15, a ratio of Mz/Mw in a range from about 30 to about 70, and a melt index in a range from about 0.5 to about 10 g/10 min. Other suitable ranges for the ratio of Mw/Mn include from about 7 to about 14, from about 8 to about 13, from about 8 to about 12, or from about 9 to about 10. Likewise, other suitable ranges for the ratio of Mz/Mw include from about 35 to about 65, from about 40 to about 60, from about 45 to about 55, or from about 47 to about 51. Additionally, other suitable ranges for the melt index include from about 0.5 to about 5, from about 0.7 to about 7, or from about 1 to about 5 g/10 min. Moreover, the ethylene polymer can be further characterized by a Mn in a range from about 10,000 to about 25,000 g/mol, from about 13,000 to about 22,000 g/mol, from about 15,000 to about 20,000 g/mol, or from about 16,000 to about 18,000 g/mol. Additionally or alternatively, the ethylene polymer can have a Mw in a range from about 100,000 to about 400,000 g/mol, from about 100,000 to about 300,000 g/mol, from about 110,000 to about 250,000 g/mol, or from about 140,000 to about 200,000 g/mol. Additionally or alternatively, the ethylene polymer can be characterized by a less than or equal to about 2, less than or equal to 1, less than or equal to about 0.8, less than or equal to about 0.5, or less than or equal to about 0.2 LCBs per million total carbon atoms.

If not already specified, these illustrative and non-limiting examples of ethylene polymers consistent with the present invention also can have any of the polymer properties listed below and in any combination.

Olefin polymers (e.g., ethylene homopolymers and/or copolymers) produced in accordance with some aspects of this invention generally can have a melt index (MI) from 0 to about 100 g/10 min. Melt indices in the range from 0 to about 50 g/10 min, from 0 to about 25 g/10 min, or from 0 to about 10 g/10 min, are contemplated in other aspects of this invention. For example, a polymer of the present invention can have a melt index in a range from 0 to about 5, from 0 to about 3, from 0 to about 1, or from 0 to about 0.5 g/10 min.

Olefin polymers produced in accordance with this invention can have a high load melt index (HLMI) of less than or equal to about 200, less than or equal to about 150, or less than or equal to about 100 g/10 min. Suitable ranges for the HLMI can include, but are not limited to, from 0 to about 150, from about 2 to about 120, from about 1 to about 100, from about 1 to about 80, from about 2 to about 80, from about 4 to about 60, from about 8 to about 60, from about 1 to about 50, from about 4 to about 50, from about 3 to about 40, or from about 6 to about 40 g/10 min.

Olefin polymers produced in accordance with this invention also can be characterized by their melt index properties relative to olefin polymers produced using a comparable (otherwise identical) catalysts prepared without an irradiation step (e.g., a reduced chromium catalyst can be prepared by using a heating step to reduce hexavalent chromium species; the supported chromium catalyst without reduction; etc.). In certain aspects, the MI (or HLMI) of the olefin polymer produced by the process can be greater than 50% of, greater than 80% of, greater than 90% of, greater than 100% of, greater than 120% of, greater than 150% of, or greater than 200% of, the MI (or HLMI) of an olefin polymer obtained without the irradiating step, under the same polymerization conditions.

The densities of olefin polymers produced using the chromium catalysts and the processes disclosed herein often are greater than or equal to about 0.89 g/cm$^3$. In one aspect of this invention, the density of the olefin polymer can be in a range from about 0.89 to about 0.96 g/cm$^3$. Yet, in another aspect, the density can be in a range from about 0.91 to about 0.95 g/cm$^3$, such as, for example, from about 0.91 to about 0.94 g/cm$^3$, from about 0.92 to about 0.955 g/cm$^3$, or from about 0.93 to about 0.955 g/cm$^3$.

In an aspect, olefin polymers described herein can have a weight-average molecular weight (Mw) in a range from about 50,000 to about 2,000,000, from about 50,000 to about 1,000,000, from about 50,000 to about 700,000, from about 75,000 to about 500,000, from about 100,000 to about 500,000, from about 100,000 to about 400,000, or from about 150,000 to about 300,000 g/mol.

In an aspect, olefin polymers described herein can have a number-average molecular weight (Mn) in a range from about 2,000 to about 250,000, from about 2,000 to about 100,000, from about 2,000 to about 50,000, from about 5,000 to about 200,000, from about 5,000 to about 150,000, or from about 5,000 to about 50,000 g/mol. In another aspect, olefin polymers described herein can have a Mn in a range from about 10,000 to about 100,000, from about 10,000 to about 75,000, from about 25,000 to about 150,000, or from about 50,000 to about 150,000 g/mol.

Olefin polymers, whether homopolymers, copolymers, and so forth, can be formed into various articles of manufacture. Articles which can comprise polymers of this invention include, but are not limited to, an agricultural film, an automobile part, a bottle, a drum, a fiber or fabric, a food packaging film or container, a food service article, a fuel tank, a geomembrane, a household container, a liner, a molded product, a medical device or material, a pipe, a sheet or tape, a toy, and the like. Various processes can be employed to form these articles. Non-limiting examples of these processes include injection molding, blow molding, rotational molding, film extrusion, sheet extrusion, profile extrusion, thermoforming, and the like. Additionally, additives and modifiers are often added to these polymers in order to provide beneficial polymer processing or end-use product attributes. Such processes and materials are described in *Modern Plastics Encyclopedia*, Mid-November 1995 Issue, Vol. 72, No. 12; and *Film Extrusion Manual—Process, Materials, Properties*, TAPPI Press, 1992; the disclosures of which are incorporated herein by reference in their entirety.

Also contemplated herein is a method for forming or preparing an article of manufacture comprising a polymer produced by any of the polymerization processes disclosed herein. For instance, a method can comprise (i) contacting a chromium catalyst (e.g., produced as described herein) and an optional co-catalyst with an olefin monomer and an optional olefin comonomer under polymerization conditions in a polymerization reactor system to produce an olefin polymer; and (ii) forming an article of manufacture comprising the olefin polymer (e.g., having any of the polymer properties disclosed herein). The forming step can comprise blending, melt processing, extruding, molding, or thermoforming, and the like, including combinations thereof.

EXAMPLES

The invention is further illustrated by the following examples, which are not to be construed in any way as imposing limitations to the scope of this invention. Various other aspects, modifications, and equivalents thereof which, after reading the description herein, may suggest themselves to one of ordinary skill in the art without departing from the spirit of the present invention or the scope of the appended claims.

Melt index (MI, g/10 min) was determined in accordance with ASTM D1238 at 190° C. with a 2.16 kg weight, $I_{10}$ (g/10 min) was determined in accordance with ASTM D1238 at 190° C. with a 10 kg weight, and high load melt index (HLMI, g/10 min) was determined in accordance with ASTM D1238 at 190° C. with a 21.6 kg weight. BET surface areas can be determined using the BET nitrogen adsorption method of Brunaur et al., *J. Am. Chem. Soc.*, 60, 309 (1938). Total pore volumes can be determined in accordance with Halsey, G. D., *J. Chem. Phys.* (1948), 16, pp. 931.

In these examples, supported chromium catalysts comprising hexavalent chromium species were irradiated under UV-visible light in the presence of various reductants and under various treatment conditions. Prior to irradiation, the supported chromium catalysts were calcined at the specified temperature in dry air (an oxidizing atmosphere) in a fluidized bed for three hours, in order to convert the chromium species to their respective hexavalent oxidation state.

For each of the examples provided below, about two grams of the supported catalyst were first charged to an air-tight glass container at 25° C., optionally in the presence of a reductant. The glass container was then exposed to light as noted in Tables I-IV below. For examples where the glass container was exposed to sunlight, the container was taken outside and placed in direct sunlight, slowly rotating the container to ensure even exposure of the supported chromium catalyst mixture. For examples where the glass container was exposed to artificial light, the sample was placed in a box containing a fluorescent light emitting light in the UV-Vis spectrum. Examples not exposed to light were stored under dim lighting, or wrapped in foil to ensure no light entered the glass container. Reduction of the supported chromium catalysts was monitored by the presence of a color change. For each catalyst, the starting hexavalent supported chromium catalyst had an orange color which darkened significantly upon exposing the catalyst to light in the presence of a reductant, indicating reduction of the supported chromium catalyst starting material.

The reduced chromium catalysts, prepared as described above, were used in polymerization experiments conducted in a 2-L stainless-steel autoclave reactor containing 1.2 L of isobutane as a diluent. The polymerization reactions were conducted in the dark, and ethylene was fed on demand to maintain a reactor pressure of 550 psig. The reactor was maintained at the 105° C. (unless otherwise specified) throughout the experiment by an automated heating-cooling system. For copolymerization experiments, 1-hexene was flushed in with the initial ethylene charge. At the end of each experiment, the resulting polymer was dried at 60° C. under reduced pressure.

Examples 1-20

Examples 1-20 employed a supported chromium catalyst comprising silica-titania (2.5 wt. % Ti and 1.0 wt. % Cr). The Cr/silica-titania catalyst had a BET surface area of 500 m$^2$/g, a pore volume of 2.5 mL/g, and an average particle size of 130 μm. The Cr/silica-titania catalysts were calcined at 850° C. (except as indicated otherwise) in dry air (an oxidizing atmosphere) in order to convert the respective chromium species to the hexavalent oxidation state. Tables I-II summarize the various catalyst reductions, catalyst productivity (grams of polyethylene per gram of catalyst), catalyst activity (grams of polyethylene per gram of catalyst per hour), and resultant polymer HLMI, $I_{10}$, and MI (g/10 min).

Comparative Examples 1-6 describe attempts to reduce the hexavalent chromium present on the Cr/silica-titania catalysts without exposing the catalyst to light in the presence of a reductant. As shown in Examples 1-2, when no reductant was present, the catalyst was unaffected by light (orange). In contrast, Examples 9-20 each underwent a color change following exposure to light after as little as 10 minutes in the presence of various reductants, the color change persisting after being removed from the light. Unexpectedly, when a reductant was present, even short exposures of light resulted in a color change, indicating reduction of the chromium to a lower valence chromium species. In fact, the catalyst activity and melt index potential of the catalysts were improved by relatively short exposures to light, as shown by Inventive Examples 9, 13, and 17.

In addition to reductions with ethylene, the reduction step was surprisingly effective for hydrocarbons that are relatively difficult to oxidize, such as methane and benzene. Examples 3-6 demonstrate the difficulty of reducing Cr(VI) catalysts in the presence of the hydrocarbon methane using conventional methods. In Examples 3-6, methane was passed through the catalysts in a fluidized bed (without light), and required heating to 350° C. and above (Examples 4-6) before a color change was observed. In contrast, and unexpectedly, exposing samples of the catalyst to sunlight in the presence of methane, without heating, induced a color change in the catalyst mixture within minutes (Example 13). Even more surprising, reduction in the presence of methane by the inventive method was not accompanied by a significant loss in catalyst activity and melt index potential, indicating that the catalyst produced in the presence of light is fundamentally distinct from that produced by conventional methods. Note the higher catalyst activities and melt index properties of Examples 13-14 as compared to Examples 3-6.

Examples 15-17 provide additional examples of reductions using compounds that are traditionally poor reductants, including tetrafluoroethane and benzene. Each example demonstrated a distinct and quick color change upon exposure to light. The use of benzene resulted in increased catalyst activity and comparable melt index properties to Comparative Examples 1-2.

Inventive Examples 18-19 were conducted using $H_2$ as the reductant. Surprisingly, the reduction produced an active catalyst within minutes having increased MI potential and comparable activity, relative to the Comparative Example 7. This result is unexpected, particularly because thermal reduction in hydrogen typically results in a relatively inactive catalyst with low MI potential.

Comparative Example 8 is provided as direct comparison for Example 20, where the Cr/silica-titania catalyst was calcined at slightly elevated temperatures (871° C.), prior to being reduced in the presence of methane for 6 hr. The resulting reduced Cr/silica-titania catalysts were used in an ethylene/1-hexene copolymerization reaction, and surprisingly, both the catalyst activity and melt index properties of the catalyst reduced in the presence of light were higher than the Cr(VI)/silica-titania catalyst of Comparative Example 8.

TABLE I

Comparative Examples 1-8 using Cr/silica-titania without light reduction

| Example | Reductant | Treatment | Color | Productivity (gPE/gCat) | Activity (g/g/h) | HLMI (g/10 min) | $I_{10}$ (g/10 min) | MI (g/10 min) |
|---|---|---|---|---|---|---|---|---|
| 1 | None | None, 1 week | orange | 2315 | 3307 | 110 | 27.2 | 1.97 |
| 2 | None | light, 1 week | orange | 2434 | 3319 | 96 | 23.7 | 1.75 |
| 3 | methane | none (300° C.) | orange | 3087 | 3705 | 39 | 8.7 | 0.55 |
| 4 | methane | none (350° C.) | green | 2209 | 3488 | 28 | 6.5 | 0.46 |
| 5 | methane | none (400° C.) | green | 1823 | 3646 | 22 | 5.2 | 0.32 |
| 6 | methane | none (450° C.) | green | 2338 | 2646 | 17 | 3.8 | 0.23 |
| 7* | none | none | orange | 2919 | 3434 | 47 | 10.3 | 0.64 |
| 8*† | none | none | orange | 3095 | 12379 | 62 | 14.2 | 0.91 |

*The catalyst was calcined at a temperature of 871° C.
†The polymerization reaction was conducted at 100° C. in the presence of 5 mL 1-hexene.

TABLE II

Inventive Examples 9-20 using Cr/silica-titania with light reduction

| Example | Reductant | Treatment | Color | Productivity (gPE/gCat) | Activity (g/g/h) | HLMI (g/10 min) | I$_{10}$ (g/10 min) | MI (g/10 min) |
|---|---|---|---|---|---|---|---|---|
| 9 | 10 psig ethylene | sunlight, 10 min | blue/gray | 2980 | 5430 | 88 | 23.1 | 1.72 |
| 10 | 12 psig ethylene | sunlight, 4 h | blue/gray | 2231 | 2434 | 71 | 17.6 | 1.38 |
| 11 | 12 psig ethylene | sunlight, 4 h | blue/gray | 2443 | 3858 | 57 | 14.6 | 1.10 |
| 12 | 10 psig ethylene (×2) | sunlight 6 h, 3 h | blue/gray | 2212 | 2328 | 30 | 7.1 | 0.50 |
| 13 | 10 psig methane | sunlight, 10 min | green | 2915 | 6780 | 114 | 26.3 | 1.95 |
| 14 | 10 psig methane | sunlight, 6 h | green | 3099 | 5469 | 70 | 16.7 | 1.17 |
| 15 | 10 psig Freon | sunlight, 2 h | green | 1554 | 1636 | 29 | 7.1 | 0.54 |
| 16 | 10 psig Freon | sunlight, 2 h | green | 2820 | 1945 | 29 | 7.0 | 0.55 |
| 17 | 4 drops benzene | sunlight 15 min | red/violet | 3951 | 5268 | 89 | 20.8 | 1.46 |
| 18* | 10 psig H$_2$ | sunlight, 15 min | green | 3297 | 2953 | 52 | 11.9 | 0.88 |
| 19* | 10 psig H$_2$ | sunlight 2 h | gray/green | 3437 | 3124 | 31 | 7.3 | 0.50 |
| 20*† | 10 psig methane | sunlight 6 h | green | 3239 | 14951 | 67 | 14.7 | 0.92 |

*The catalyst was calcined at a temperature of 871° C.
†The polymerization reaction was conducted at 100° C. in the presence of 5 mL 1-hexene.

Examples 21-26

Examples 21-26 employed a Cr/silica catalyst as the supported catalyst comprising a hexavalent chromium species (1.0 wt. % Cr). The Cr/silica catalysts were calcined at 650° C. in dry air (an oxidizing atmosphere) in order to convert the chromium to the hexavalent oxidation state. The Cr/silica catalyst had a BET surface area of 500 m$^2$/g, a pore volume of 1.6 mL/g, and an average particle size of 100 μm. Table III summarizes various catalyst reductions, catalyst productivity (grams of polyethylene per gram of catalyst), catalyst activity (grams of polyethylene per gram of catalyst per hour), and resultant polymer HMLI, I10, and MI (g/10 min).

Using ethylene as the reductant, Examples 22-23 demonstrated comparable catalyst activity to Example 21, but an unexpected improvement in melt index potential. Also unexpectedly, the catalysts prepared with the methane reductant in sunlight resulted in a significant increase in catalyst activity, comparable melt index potential in ethylene homopolymerization (Example 24), and superior melt index potential in ethylene/1-hexene copolymerization (Example 26).

TABLE III

Examples using Cr/Silica Catalysts

| Ex. | Reductant | Treatment | Color | Productivity (gPE/gCat) | Activity (g/g/h) | HLMI (g/10 min) | I$_{10}$ (g/10 min) | MI (g/10 min) |
|---|---|---|---|---|---|---|---|---|
| 21 | none | none | orange | 2347 | 2996 | 4.8 | 0.82 | 0.009 |
| 22 | 10 psig ethylene (×2) | sunlight 6 h, 3 h | blue/gray | 1409 | 3019 | 6.1 | 1.22 | — |
| 23 | 10 psig ethylene (×2) | sunlight 6 h, 3 h | blue/gray | 1814 | 1432 | 7.4 | 1.53 | 0.033 |
| 24 | 10 psig methane | sunlight, 6 h | green | 2603 | 4222 | 4.0 | 0.66 | — |
| 25† | none | none | orange | 2923 | 5480 | 2.4 | 0.21 | 0 |
| 26† | 10 psig methane | sunlight, 6 h | green | 3094 | 7140 | 3.6 | 0.60 | 0.014 |

†The polymerization reaction was conducted at 100° C. in the presence of 5 mL 1-hexene.

Examples 27-29

Figure 2:
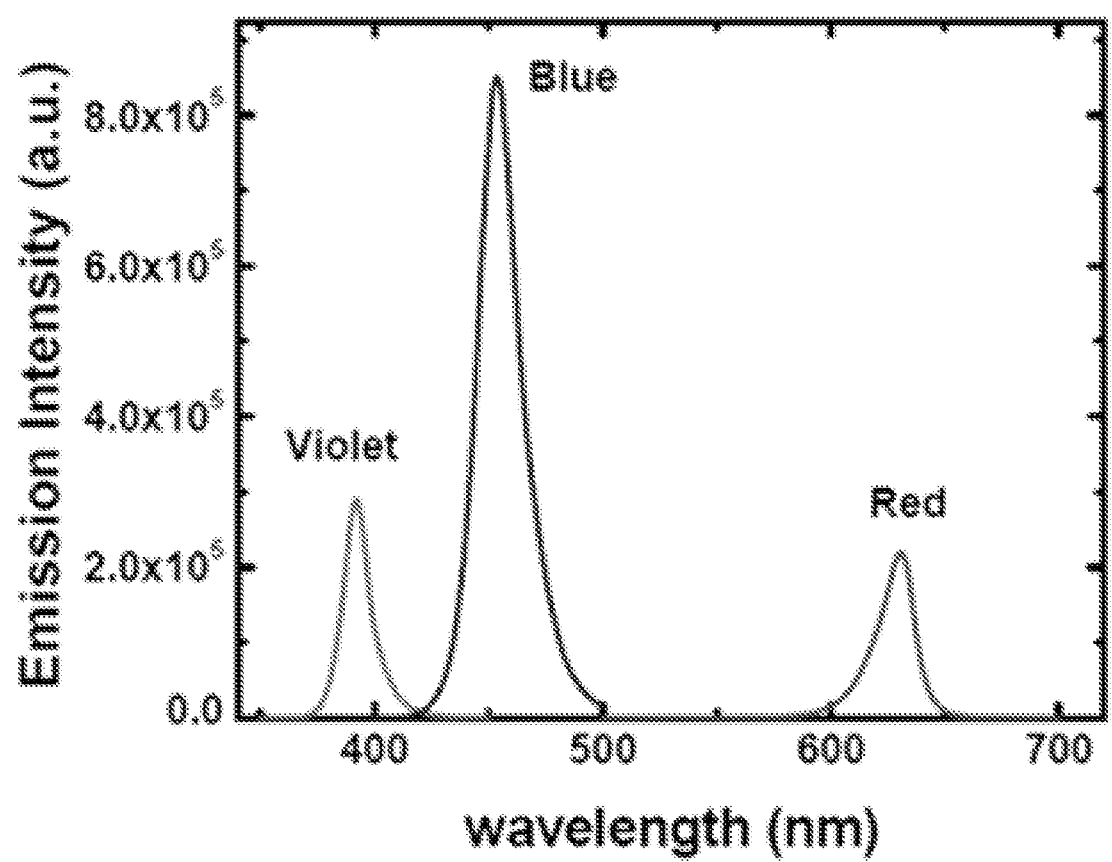
FIG. 2 presents a plot of the range of wavelengths emitted from red, blue, and violet LED diodes used to irradiate the supported chromium catalyst of Example 27.

Certain examples above were conducted in sunlight or alternatively, under a fluorescent light emitting a spectrum of UV-Visible light. In order to evaluate which wavelength of light may be most effective at reducing the hexavalent species, Cr/silica-titania catalyst as described above was prepared by calcining for 3 h at 650° C., and treating the calcined catalyst with a small amount (0.5 mL) of n-hexane in Example 27. Samples of the catalyst underwent a reduction step as conducted above, using one of a red LED (631 nm), blue LED (450 nm), or violet LED (392 nm) in glass bottles. The intensity and wavelength distribution of each light source is shown in FIG. 2. The color of each sample was monitored as an indicator of progress and efficiency of the reduction step. Of the three, the blue light was by far the most effective, whereas the red light achieved almost nothing. The violet light was also effective, but somewhat less so than the blue light. Since these experiments were conducted in glass containers that may absorb the shortest wavelengths of visible light, it is believed that a significant portion of the light emitted from the violet LED may have been absorbed by the glass.

Figure 3:
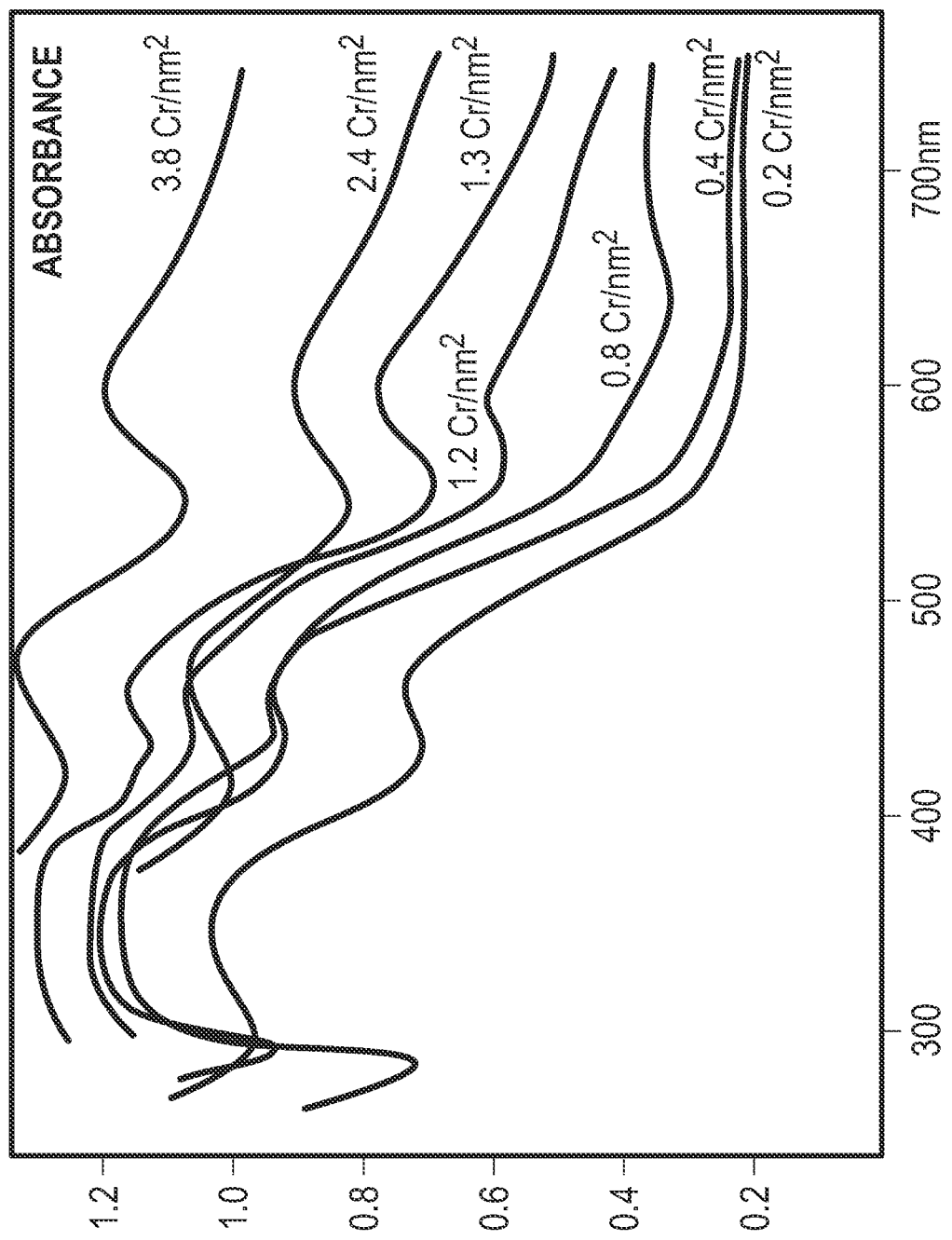
FIG. 3 present a plot of the IR reflectance of a Cr/silica catalyst of Example 28 calcined at 650° C.

In Example 28, IR reflectance spectra were obtained for a Cr/silica sample prepared as described above for Examples 21-26. As is shown in FIG. 3, the spectra demonstrate a strong absorbance at about 600 nm attributable to Cr(III) species, and another absorbance at about 340 nm attributable to Cr(VI) species. Thus, while not wishing to be bound by theory, a more effective light source for catalyst reduction should include wavelengths less than 500 nm (e.g., compare blue light versus red light in FIG. 2).

For Example 29, perfluorohexane was evaluated as a reductant in a manner similar to benzene (Example 17), but did not result in a color change. Perfluorohexane contains only C—F and C—C bonds. While not wishing to be bound by theory, it is believed that compounds with C—H bonds are more susceptible to oxidation under irradiation conditions.

Examples 30-45

Examples 30-45 were performed in the same manner as Examples 1-20 and, with the exception of Examples 36 and 42, used the same supported chromium catalyst comprising silica-titania (2.5 wt. % Ti and 1.0 wt. % Cr). The Cr/silica-titania catalysts were calcined at 871° C. in dry air. Examples 36 and 42 used a 10% Cr/silica catalyst that was calcined at 400° C. in dry air for 3 hr. Catalyst weights ranged from 0.04 to 0.26 grams and polymerization reaction times ranged from 30 to 240 for Examples 30-45. Table IV summarizes the various catalyst reductions, catalytic activity, polymer molecular weight properties, polymer rheological characterization, and polymer MI, $I_{10}$, and HLMI (g/10 min).

Molecular weights and molecular weight distributions were obtained using a PL-GPC 220 (Polymer Labs, an Agilent Company) system equipped with a IR4 detector (Polymer Char, Spain) and three Styragel HMW-6E GPC columns (Waters, Mass.) running at 145° C. The flow rate of the mobile phase 1,2,4-trichlorobenzene (TCB) containing 0.5 g/L 2,6-di-t-butyl-4-methylphenol (BHT) was set at 1 mL/min, and polymer solution concentrations were in the range of 1.0-1.5 mg/mL, depending on the molecular weight. Sample preparation was conducted at 150° C. for nominally 4 hr with occasional and gentle agitation, before the solutions were transferred to sample vials for injection. An injection volume of about 200 μL was used. The integral calibration method was used to deduce molecular weights and molecular weight distributions using a Chevron Phillips Chemical Company's HDPE polyethylene resin, MARLEX® BHB5003, as the broad standard. The integral table of the broad standard was pre-determined in a separate experiment with SEC-MALS. Mn is the number-average molecular weight, Mw is the weight-average molecular weight, Mz is the z-average molecular weight, Mv is viscosity-average molecular weight, and Mp is the peak molecular weight (location, in molecular weight, of the highest point of the molecular weight distribution curve).

Melt rheological characterizations were performed as follows. Small-strain (10%) oscillatory shear measurements were performed on an Anton Paar MCR 501 rheometer using parallel-plate geometry. All rheological tests were performed at 190° C. The complex viscosity |η*| versus frequency (ω) data were then curve fitted using the modified three parameter Carreau-Yasuda (CY) empirical model to obtain the zero shear viscosity—$\eta_0$, characteristic viscous relaxation time—$\tau_\eta$, and the breadth parameter—a (CY-a parameter). The simplified Carreau-Yasuda (CY) empirical model is as follows.

$$|\eta^*(\omega)| = \frac{\eta_0}{[1 + (\tau_\eta \omega)^a]^{(1-n)/a}},$$

wherein:
|η*(ω)|=magnitude of complex shear viscosity;
$\eta_0$=zero shear viscosity;
$\tau_\eta$=viscous relaxation time (Tau(η) in sec);
a="breadth" parameter (CY-a parameter);
n=fixes the final power law slope, fixed at 2/11; and
ω=angular frequency of oscillatory shearing deformation.

Details of the significance and interpretation of the CY model and derived parameters can be found in: C. A. Hieber and H. H. Chiang, *Rheol. Acta*, 28, 321 (1989); C. A. Hieber and H. H. Chiang, *Polym. Eng. Sci.*, 32, 931 (1992); and R. B. Bird, R. C. Armstrong and O. Hasseger, *Dynamics of Polymeric Liquids, Volume* 1, *Fluid Mechanics*, 2nd Edition, John Wiley & Sons (1987); each of which is incorporated herein by reference in its entirety.

The long chain branches (LCBs) per 1,000,000 total carbon atoms of the overall polymer were calculated using the method of Janzen and Colby (*J. Mol. Struct.*, 485/486, 569-584 (1999), incorporated herein by reference in its entirety), from values of zero shear viscosity (determined from the Carreau-Yasuda (CY) model), and measured values of Mw obtained using a Dawn EOS multiangle light scattering detector (Wyatt).

As shown in Table IV, the light reduction step was surprisingly effective for several different hydrocarbon reductants: methane, ethane, n-pentane, n-hexane, toluene, decalin, adamantane, and cyclohexane. Example 34 (34 min) and Example 35 (91 min) used different polymerization times, as did Example 43 (61 min) and Example 44 (37 min). With the exception of Examples 36 and 42, the catalysts had surprising catalytic activity and melt index potential. Examples 30-33 in Table IV demonstrate that catalyst treatment with light irradiation in the presence of a reductant reduces the long chain branching content of the polymer produced, with an unexpected increase in the CY-a parameter.

Figure 4:
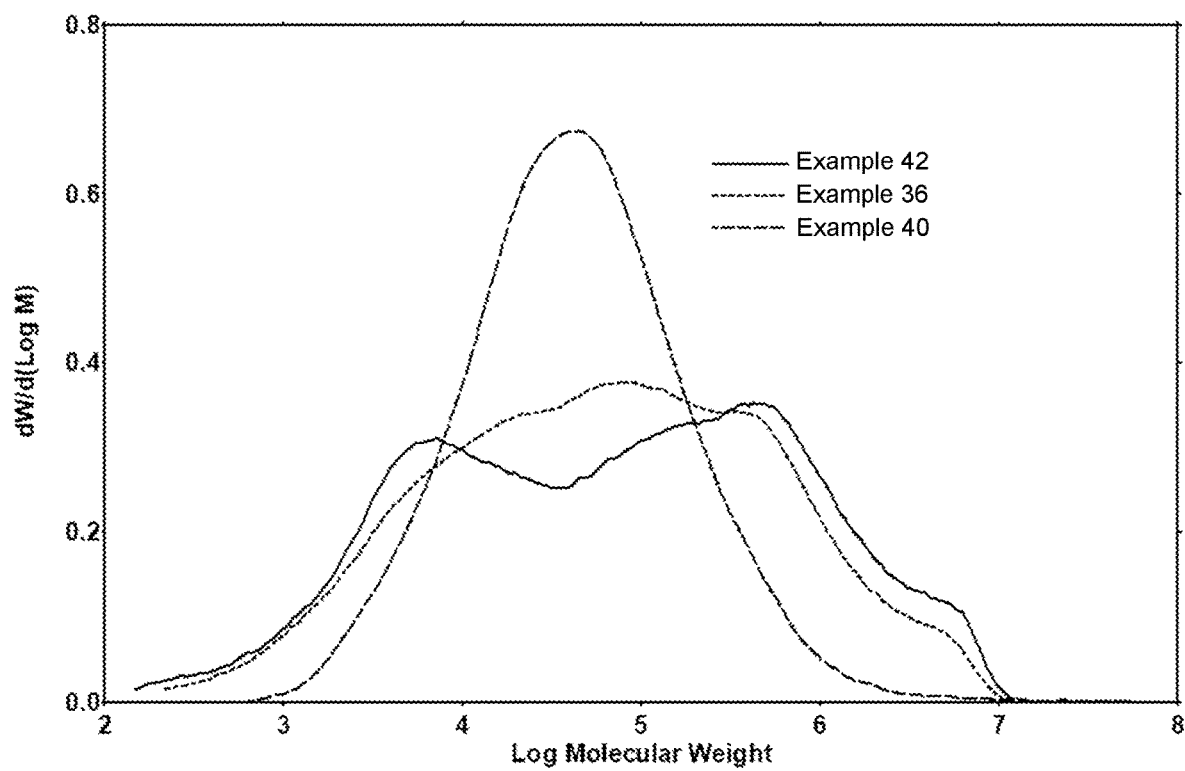
FIG. 4 presents a plot of the molecular weight distributions of the polymers of Examples 36, 40, and 42.

FIG. 4 illustrates the molecular weight distributions of the polymers of Examples 36, 40, and 42. As shown in Table IV and FIG. 4, the polymers of Example 36 (0.26 g catalyst, 151 min reaction time) and Example 42 (0.2 g catalyst, 240 min reaction time), unexpectedly, had very broad molecular weight distributions (Mw/Mn in the 50-90 range) in combination with relatively high CY-a values (0.29-0.33), and very low levels of LCBs (less than 3 per million total carbon atoms). Also surprisingly, Table IV and FIG. 4 demonstrate that the polymer of Example 40 (0.057 g catalyst, 57 min reaction time) had a long high molecular weight tail, resulting in a Mz/Mw value in the 45-50 range, despite have a relatively narrow molecular weight distribution (Mw/Mn less than 10), and substantially no LCBs.

TABLE IV

Examples 30-45

| Example | Reductant | Treatment | Color | Productivity (gPE/gCat) | Activity (g/g/h) | HLMI (g/10 min) | $I_{10}$ (g/10 min) | MI (g/10 min) | CY-a |
|---|---|---|---|---|---|---|---|---|---|
| 30 | None | None | — | — | — | — | — | 4.45 | 0.199 |
| 31 | None | None | — | — | — | — | — | 0.16 | 0.193 |
| 32 | n-pentane | Sunlight 1 h | blue/gray | 3188 | 3298 | 154 | 36.4 | 3.65 | 0.226 |
| 33 | n-hexane | White light 3 h | blue/gray | 2251 | 2936 | 139 | 32.8 | 3.22 | 0.219 |
| 34 | toluene | Blue light 1.5 h | blue/black | 1481 | 3065 | 203 | 46.8 | 3.6 | 0.199 |
| 35 | toluene | Blue light 1.5 h | blue/black | 4235 | 3434 | 67 | 15.2 | 1.1 | 0.201 |
| 36 | n-pentane | UV light 3 h | black | 238 | 107 | 3.4 | 0.5 | — | 0.294 |
| 37 | 10 psig ethane | UV light 4 h | dark blue/gray | 2267 | 2616 | 113 | 26.8 | 2.1 | 0.196 |
| 38 | toluene | Blue light 2.5 h | black | 2312 | 2070 | 153 | 33.4 | 2.9 | 0.205 |
| 39 | decalin | Blue light 2 h | blue | 1954 | 2345 | 198 | 34.7 | 4.2 | 0.204 |
| 40 | adamantane | Blue light 2 h | blue | 2205 | 2646 | 166 | 30.6 | 3.5 | 0.200 |
| 41 | cyclohexane | Blue light 2 h | blue | 2423 | 1069 | 47 | 7.3 | 0.8 | 0.210 |
| 42 | None | None | dark red | 262 | 81 | 0.5 | — | — | 0.327 |
| 43 | methane | Blue light 2 h | green | 2692 | 2884 | 157 | 36.5 | 3.4 | 0.229 |
| 44 | methane | Blue light 2 h | blue/gray | 1024 | 1920 | 82 | 18.6 | 1.5 | 0.174 |
| 45 | None | None | orange | 2668 | 2541 | 220 | 51.7 | 4.6 | 0.219 |

| Example | Reductant | Mn (kg/mol) | Mw (kg/mol) | Mz (kg/mol) | Mw/Mn | Mz/Mw | $\eta_0$ (Pa-sec) | $\tau_\eta$ (sec) | J-C LCB (per MM C) |
|---|---|---|---|---|---|---|---|---|---|
| 30 | None | — | — | — | — | — | — | — | — |
| 31 | None | — | — | — | — | — | — | — | — |
| 32 | n-pentane | 14.7 | 100 | 579 | 6.8 | 5.8 | 9.68E+03 | 0.016 | 8.8 |
| 33 | n-hexane | 9.8 | 102 | 962 | 10.3 | 9.5 | 1.24E+04 | 0.022 | 9.9 |
| 34 | toluene | 11.1 | 107 | 1060 | 9.6 | 9.9 | 1.24E+04 | 0.020 | 7.8 |
| 35 | toluene | 14.3 | 142 | 1129 | 9.9 | 8.0 | 4.42E+04 | 0.081 | 6.4 |
| 36 | n-pentane | 8.3 | 416 | 2810 | 50.3 | 6.8 | 4.11E+06 | 50.4 | 2.2 |
| 37 | ethane | 9.6 | 120 | 1159 | 12.5 | 9.6 | 2.29E+04 | 0.034 | 7.7 |
| 38 | toluene | 14.7 | 101 | 760 | 6.9 | 7.5 | 1.26E+04 | 0.020 | 10.3 |
| 39 | decalin | 14.4 | 108 | 835 | 7.5 | 7.7 | 9.74E+03 | 0.014 | 5.9 |
| 40 | adamantane | 17.2 | 166 | 8076 | 9.6 | 48.6 | 1.20E+04 | 0.015 | <0.01 |
| 41 | cyclohexane | 15.7 | 162 | 1453 | 10.4 | 9.0 | 5.23E+04 | 0.111 | 4.2 |
| 42 | None | 6.3 | 557 | 3342 | 88.5 | 6.0 | 7.01E+06 | 49.6 | 1.2 |
| 43 | methane | 13.8 | 104 | 726 | 7.5 | 7.0 | 8.20E+03 | 0.014 | 6.2 |
| 44 | methane | 14.3 | 130 | 1165 | 9.1 | 9.0 | 3.31E+04 | 0.024 | 7.4 |
| 45 | None | 12.9 | 102 | 843 | 7.9 | 8.3 | 8.01E+03 | 0.013 | 6.6 |

Examples 46-52

Examples 46-52 were performed to determine the extent of reduction of the hexavalent chromium and the average valence after reduction in a representative supported chromium catalyst. Table V summarizes the results. Example 52 was a chromium/silica-titania catalyst containing approximately 0.8 wt. % chromium and 7 wt. % titania, and having a BET surface area of 530 m²/g, a pore volume of 2.6 mL/g, and an average particle size of 130 um, which was calcined in dry air at 850° C. for 3 hr to convert chromium to the hexavalent oxidation state (orange). This converted over 86 wt. % of the chromium into the hexavalent state. For Examples 46-47, approximate 2 g samples of the catalyst of Example 52 were separately charged to a glass reaction vessel and 0.5 mL of liquid isopentane was charged to the vessel. For Examples 48-49, about 1.5 atm of gaseous ethane was charged to the glass bottle. Then, the bottle was placed in a light-proof box under blue fluorescent light (approximately 2 times the intensity expected from sunlight), and the bottle was continuously rotated so that all of the catalyst was exposed to the light for 24 hr. The final catalyst color is noted in Table V. Afterward, into the bottle, along with the catalyst, was introduced about 20 mL of a solution of 2 M $H_2SO_4$. To this was added 5 drops of ferroin Fe(+3) indicator. This usually turned a blue-green color indicating the presence of Fe(III) ions. Next, the solution was titrated to the ferroin endpoint (red color) using a solution of ferrous ammonium sulfate, which had been previously calibrated by reaction with a standardized 0.1 M sodium dichromate solution. When the solution turned red, the end point was signaled, and the titrant volume was recorded, to calculate the oxidation capacity of the catalyst, expressed as wt. % Cr(VI) and as percent reduced, that is, the percent of the original Cr(VI) oxidative power that has been removed by the reduction treatment. The average valence was also computed by multiplying the percent reduced by +3 and subtracting that number from +6.

Of course, this treatment gives only an average oxidation state. Note that although Table V lists the oxidative power measured as wt. % Cr(VI), in reality all of the chromium could be present in lower valence states, such as Cr(IV) or Cr(V). Thus, the Cr(VI) value in Table V only lists the maximum amount of Cr(VI) that could be present. More likely, the reduced catalysts have a combination of several valence states that produce the measured oxidative power. Note that some of the reduced chromium, and particularly those catalysts reduced with CO, may be in the divalent state, which would not have been detected in this test, which stops in the trivalent state.

Example 52 demonstrates that the air-calcined chromium catalyst contained substantially most of its chromium (0.69/0.80=86 wt. %) present as Cr(VI), and it is this Cr(VI) amount that is being reduced in the light treatment. Therefore, this amount of Cr(VI) serves as the starting amount, which had an average valence of +6, and which serves as a reference, to which the reduced catalysts are then compared. Examples 46-47 were reduced chromium catalysts with an average valence of approximately +3.3, with no more than 0.06 wt. % Cr(VI), and with less than 10 wt. % of the starting hexavalent chromium still remaining in the hexavalent oxidation state. Examples 48-49 were reduced chromium catalysts with an average valence of approximately +4.1, with no more than 0.26 wt. % Cr(VI), and with less than 40 wt. % of the chromium in the hexavalent oxidation state. For Examples 50-51, the catalyst was reduced in CO with either blue light or elevated temperature, resulting in no oxidative power being measured (0 wt. % Cr(VI) in the table). Thus, the average valence must be no more than +3. But the catalyst that was CO-reduced by conventional means (Example 51) is known to have a valence of mostly Cr(II), which is not detected in this test. Accordingly, Examples 50 and 51 are listed as less than or equal to +3. Notably, this test cannot distinguish between Cr(II) and Cr(III) species, but there was no measurable amount of hexavalent chromium in Examples 50-51.

TABLE V

Examples 46-52

| Example | Reductant | Treatment | Color | Catalyst (g) | Cr(VI) (wt. %) | Reduced (wt. %) | Average Valence |
|---|---|---|---|---|---|---|---|
| 46 | isopentane | Blue light 24 hr | blue | 2.05 | 0.06 | 90.8 | 3.28 |
| 47 | isopentane | Blue light 24 hr | blue | 2.08 | 0.06 | 90.9 | 3.27 |
| 48 | ethane | Blue light 24 hr | olive green | 2.14 | 0.26 | 62.3 | 4.13 |
| 49 | ethane | Blue light 24 hr | olive green | 2.30 | 0.26 | 61.9 | 4.14 |
| 50 | CO | Blue light 2 hr | blue green | 2.33 | 0.00 | 100 | ≤3 |
| 51 | CO | CO reduction 30 min - 350° C. | blue | 2.52 | 0.00 | 100 | ≤3 |
| 52 | None | None | orange | — | 0.69 | 0 | 6.00 |

The invention is described above with reference to numerous aspects and specific examples. Many variations will suggest themselves to those skilled in the art in light of the above detailed description. All such obvious variations are within the full intended scope of the appended claims. Other aspects of the invention can include, but are not limited to, the following (aspects are described as "comprising" but, alternatively, can "consist essentially of" or "consist of"):

Aspect 1. A method for reducing a chromium catalyst for olefin polymerization, the method comprising irradiating a reductant and a supported chromium catalyst comprising chromium in the hexavalent oxidation state with a light beam at a wavelength in the UV-visible spectrum to reduce at least a portion of the supported chromium catalyst to form a reduced chromium catalyst.

Aspect 2. The method defined in aspect 1, wherein the method comprises irradiating a mixture of the supported chromium catalyst and the reductant in a diluent at any suitable pressure.

Aspect 3. The method defined in aspect 2, wherein the diluent comprises any suitable hydrocarbon solvent or any hydrocarbon solvent disclosed herein, e.g., 1-hexene, hexanes, isobutane, toluene, or cyclohexene, as well as mixtures or combinations thereof.

Aspect 4. The method defined in any one of the preceding aspects, wherein the supported chromium catalyst comprises any suitable solid oxide or any solid oxide disclosed herein, e.g., silica, alumina, silica-alumina, silica-coated alumina, aluminum phosphate, aluminophosphate, heteropolytungstate, titania, zirconia, magnesia, boria, zinc oxide, silica-titania, silica-zirconia, alumina-titania, alumina-zirconia, zinc-aluminate, alumina-boria, silica-boria, aluminophosphate-silica, titania-zirconia, etc., or any combination thereof.

Aspect 5. The method defined in any one of aspects 1-3, wherein the supported chromium catalyst comprises silica, silica-alumina, silica-coated alumina, silica-titania, silica-titania-magnesia, silica-zirconia, silica-magnesia, silica-boria, aluminophosphate-silica, etc., or any combination thereof.

Aspect 6. The method defined in any one of aspects 1-3, wherein the supported chromium catalyst comprises chromium/silica, chromium/silica-titania, chromium/silica-titania-magnesia, chromium/silica-alumina, chromium/silica-coated alumina, chromium/aluminophosphate, etc., or any combination thereof.

Aspect 7. The method defined in any one of the preceding aspects, wherein the catalyst has a total pore volume in any suitable range or any range disclosed herein, e.g., from about 0.5 to about 5 mL/g, from about 1 to about 5 mL/g, from about 0.9 to about 3 mL/g, from about 1.2 to about 2.5 mL/g, etc.

Aspect 8. The method defined in any one of the preceding aspects, wherein the catalyst has a BET surface area in any suitable range or any range disclosed herein, e.g., from about 100 to about 1000 m$^2$/g, from about 200 to about 700 m$^2$/g, from about 250 to about 600 m$^2$/g, from about 275 to about 525 m$^2$/g, etc.

Aspect 9. The method defined in any one of the preceding aspects, wherein the catalyst further comprises any suitable modification or any modification disclosed herein, e.g., titanated, fluorided, sulfated, phosphated, etc.

Aspect 10. The method defined in any one of the preceding aspects, further comprising a step of calcining to form the supported chromium catalyst comprising chromium in the hexavalent oxidation state, wherein calcining comprises any suitable peak temperature and time conditions or any peak temperature and time conditions disclosed herein, e.g., a peak temperature from about 300° C. to about 1000° C., from about 500° C. to about 900° C., from about 550° C. to about 870° C., etc., for a time period of from about 1 min to about 24 hr, from about 1 hr to about 12 hr, from about 30 min to about 8 hr, etc.

Aspect 11. The method defined in any one of the preceding aspects, wherein the supported chromium catalyst (or reduced chromium catalyst) comprises any suitable amount of chromium or any amount disclosed herein, e.g., from about 0.01 to about 20 wt. %, from about 0.1 to about 10 wt. %, from about 0.2 to about 5 wt. %, from about 0.2 to about 2.5 wt. %, etc., based on the weight of the catalyst.

Aspect 12. The method defined in any one of the preceding aspects, wherein the wavelength comprises a single wavelength or a range of wavelengths in the visible spectrum.

Aspect 13. The method defined in any one of aspects 1-11, wherein the wavelength comprises a single wavelength or a range of wavelengths in the 200 nm to 750 nm range.

Aspect 14. The method defined in any one of aspects 1-11, wherein the wavelength comprises a single wavelength or a range of wavelengths in the 300 to 750 nm range, the 350 nm to 650 nm range, the 300 nm to 500 nm range, or the 300 nm to 400 nm range.

Aspect 15. The method defined in any one of aspects 1-11, wherein the wavelength comprises a single wavelength or a range of wavelengths below 600 nm, below 525 nm, or below 500 nm.

Aspect 16. The method defined in any one of the preceding aspects, wherein the wavelength is a single wavelength.

Aspect 17. The method defined in any one of aspects 1-15, wherein the wavelength is a range of wavelengths spanning at least 25 nm, at least 50 nm, at least 100 nm, at least 200 nm, etc.

Aspect 18. The method defined in any one of the preceding aspects, wherein the irradiating step is conducted at any suitable temperature or any temperature disclosed herein, e.g., less than about 200° C., less than about 100° C., less than about 40° C., from about 0° C. to about 100° C., from about 10° C. to about 40° C., etc.

Aspect 19. The method defined in any one of the preceding aspects, wherein the irradiating step is conducted for any suitable exposure time or for any exposure time disclosed herein, e.g., from about 15 sec to about 10 hr, from about 1 min to about 6 hr, from about 1 min to about 15 min, from about 5 min to about 1 hr, etc.

Aspect 20. The method defined in any one of the preceding aspects, wherein the light beam has any suitable intensity or an intensity in any range disclosed herein, e.g., at least about 500 lumens, at least about 1000 lumens, at least about 2000 lumens, at least about 5000 lumens, at least about 10,000 lumens, at least about 20,000 lumens, etc.

Aspect 21. The method defined in any one of the preceding aspects, wherein the light beam has any suitable power or any power disclosed herein, e.g., at least about 50 watts, at least about 100 watts, at least about 200 watts, at least about 500 watts, at least about 1,000 watts, at least about 2,000 watts, etc.

Aspect 22. The method defined in any one of the preceding aspects, wherein the supported chromium catalyst is irradiated with any suitable illuminance or any illuminance disclosed herein, e.g., at least about 100 lux, at least about 500 lux, at least about 1000 lux, at least about 2000 lux, at least about 5000 lux, at least about 10,000 lux, at least about 20,000 lux, at least about 100,000 lux, etc.

Aspect 23. The method defined in any one of the preceding aspects, wherein the portion of the chromium of the supported chromium catalyst in the hexavalent oxidation state is at least about 10 wt. %, at least about 20 wt. %, at least about 40 wt. %, at least about 60 wt. %, at least about 80 wt. %, at least about 90 wt. %, etc., and/or the portion of the chromium of the reduced chromium catalyst in the hexavalent oxidation state is less than or equal to about 75 wt. %, less than or equal to about 50 wt. %, less than or equal to about 40 wt. %, less than or equal to about 30 wt. %, etc.

Aspect 24. The method defined in any one of the preceding aspects, wherein the chromium in the reduced chromium catalyst has an average valence of less than or equal to about 5.25, less than or equal to about 5, less than or equal to about 4.75, less than or equal to about 4.5, less than or equal to about 4.25, less than or equal to about 4, etc.

Aspect 25. The method defined in any one of the preceding aspects, wherein the reduced chromium catalyst has a catalyst activity greater (by any amount disclosed herein, e.g., at least 10%, at least 20%, at least 50%, etc.) than that of the supported chromium catalyst, under slurry polymerization conditions at a temperature of 105° C. and a pressure of 550 psig, and/or the reduced chromium catalyst has a catalyst activity greater (by any amount disclosed herein, e.g., at least 10%, at least 20%, at least 50%, etc.) than that of an otherwise identical catalyst prepared using the same reductant at an elevated temperature (e.g., 300° C., 350° C., 400° C., 450° C., or 500° C.) without light irradiation, under slurry polymerization conditions at a temperature of 105° C. and a pressure of 550 psig.

Aspect 26. A reduced chromium catalyst prepared by the method of any one of the preceding aspects.

Aspect 27. A catalyst preparation system comprising:
(a) a catalyst preparation vessel configured to conduct the method for reducing a chromium catalyst defined in any one of aspects 1-25;
(b) a catalyst inlet configured to introduce a slurry of the supported chromium catalyst into the catalyst preparation vessel, wherein at least a portion of the chromium is in the hexavalent oxidation state; and
(c) a reduced catalyst outlet configured to withdraw a slurry of a reduced chromium catalyst from the catalyst preparation vessel.

Aspect 28. A catalyst preparation system comprising:
(a) a catalyst preparation vessel configured to irradiate a slurry of a supported chromium catalyst in a diluent with a light beam at a wavelength in the UV-visible spectrum;
(b) a catalyst inlet configured to introduce the slurry of the supported chromium catalyst into the catalyst preparation vessel, wherein at least a portion of the chromium is in the hexavalent oxidation state; and
(c) a reduced catalyst outlet configured to withdraw a slurry of a reduced chromium catalyst from the catalyst preparation vessel.

Aspect 29. The system defined in aspect 27 or 28, wherein the diluent comprises any suitable reductant or any reductant disclosed herein, e.g., substituted or unsubstituted hydrocarbons, saturated or unsaturated hydrocarbons, etc.

Aspect 30. The system defined in any one of aspects 27-29, wherein the catalyst preparation system further comprises a reductant inlet configured to introduce a feed stream of a reductant into the catalyst preparation vessel.

Aspect 31. The system defined in any one of aspects 27-30, wherein the catalyst preparation vessel is any suitable vessel or any vessel disclosed herein, e.g., a stirred tank, a flow reactor vessel, etc.

Aspect 32. The system defined in any one of aspects 27-31, wherein the catalyst preparation system is configured to operate batchwise or continuously.

Aspect 33. The system defined in any one of aspects 27-32, wherein the slurry of the supported chromium catalyst is irradiated for any suitable residence time (or exposure time) or for any duration disclosed herein, e.g., from about 15 sec to about 10 hr, from about 1 min to about 6 hr, from about 1 min to about 15 min, from about 5 min to about 1 hr, etc.

Aspect 34. The system defined in any one of aspects 27-33, wherein the catalyst preparation system further comprises a lamp assembly inside or outside the catalyst preparation vessel.

Aspect 35. The system defined in any one of aspects 27-34, wherein the catalyst preparation vessel comprises any suitable source or any source disclosed herein, e.g., sunlight, a fluorescent white light, a UV lamp, etc., for the light beam.

Aspect 36. The system defined in any one of aspects 27-35, wherein the catalyst preparation system further comprises a co-catalyst inlet configured to introduce a co-catalyst feed stream into the catalyst preparation vessel.

Aspect 37. The system defined in any one aspects 27-36, wherein the catalyst preparation system further comprises (d) a controller configured to control the residence time of the supported chromium catalyst in the catalyst preparation vessel, and/or the temperature of the catalyst preparation vessel, and/or the intensity of the light beam, and/or the wavelength of the light beam, and/or the amount of the reduced chromium catalyst, and/or the molar ratio of the reductant to chromium.

Aspect 38. A polymerization reactor system comprising:
the catalyst preparation system defined in any one of aspects 27-37; and
a reactor configured to contact the reduced chromium catalyst with an olefin monomer and an optional olefin comonomer under polymerization reaction conditions to produce an olefin polymer.

Aspect 39. An olefin polymerization process comprising:
contacting the reduced chromium catalyst defined in aspect 26 and an optional co-catalyst with an olefin monomer and an optional olefin comonomer in a polymerization reactor system under polymerization reaction conditions to produce an olefin polymer.

Aspect 40. An olefin polymerization process comprising:
(I) irradiating a reductant and a supported chromium catalyst comprising chromium in the hexavalent oxidation state with a light beam at a wavelength in the UV-visible spectrum to reduce at least a portion of the supported chromium catalyst to form a reduced chromium catalyst; and
(II) contacting the reduced chromium catalyst and an optional co-catalyst, with an olefin monomer and an optional olefin comonomer in a polymerization reactor system under polymerization reaction conditions to produce an olefin polymer.

Aspect 41. The olefin polymerization process defined in aspect 39 or 40 or the polymerization reactor system defined in aspect 38, wherein the olefin monomer comprises any olefin monomer disclosed herein, e.g., any $C_2$-$C_{20}$ olefin.

Aspect 42. The olefin polymerization process defined in any one of aspects 39-41 or the polymerization reactor system defined in aspect 38, wherein the olefin monomer comprises ethylene.

Aspect 43. The olefin polymerization process defined in any one of aspects 39-42 or the polymerization reactor system defined in aspect 38, wherein the olefin monomer and the optional olefin comonomer independently comprise a $C_2$-$C_{20}$ alpha-olefin.

Aspect 44. The olefin polymerization process defined in any one of aspects 39-43 or the polymerization reactor system defined in aspect 38, wherein the catalyst is contacted with ethylene and an olefin comonomer comprising a $C_3$-$C_{10}$ alpha-olefin.

Aspect 45. The olefin polymerization process defined in any one of aspects 39-44 or the polymerization reactor system defined in aspect 38, wherein the catalyst is contacted with ethylene and an olefin comonomer comprising 1-butene, 1-hexene, 1-octene, or a mixture thereof.

Aspect 46. The olefin polymerization process defined in any one of aspects 39-41 or the polymerization reactor system defined in aspect 38, wherein the olefin monomer comprises propylene.

Aspect 47. The olefin polymerization process defined in any one of aspects 39-46 or the polymerization reactor system defined in aspect 38, wherein the polymerization reactor system comprises a batch reactor, a slurry reactor, a gas-phase reactor, a solution reactor, a high pressure reactor, a tubular reactor, an autoclave reactor, or a combination thereof.

Aspect 48. The olefin polymerization process defined in any one of aspects 39-47 or the polymerization reactor system defined in aspect 38, wherein the polymerization reactor system comprises a slurry reactor, a gas-phase reactor, a solution reactor, or a combination thereof.

Aspect 49. The olefin polymerization process defined in any one of aspects 39-48 or the polymerization reactor system defined in aspect 38, wherein the polymerization reactor system comprises a loop slurry reactor.

Aspect 50. The olefin polymerization process defined in any one of aspects 39-49 or the polymerization reactor system defined in aspect 38, wherein the polymerization reactor system comprises a single reactor.

Aspect 51. The olefin polymerization process defined in any one of aspects 39-49 or the polymerization reactor system defined in aspect 38, wherein the polymerization reactor system comprises two reactors.

Aspect 52. The olefin polymerization process defined in any one of aspects 39-49 or the polymerization reactor system defined in aspect 38, wherein the polymerization reactor system comprises more than two reactors.

Aspect 53. The olefin polymerization process defined in any one of aspects 39-52 or the polymerization reactor system defined in aspect 38, wherein the olefin polymer comprises any olefin polymer disclosed herein.

Aspect 54. The olefin polymerization process defined in any one of aspects 39-45 or 47-53 or the polymerization reactor system defined in aspect 38, wherein the olefin polymer comprises an ethylene/1-butene copolymer, an ethylene/1-hexene copolymer, and/or an ethylene/1-octene copolymer.

Aspect 55. The olefin polymerization process defined in any one of aspects 39-41 or 46-53 or the polymerization reactor system defined in aspect 38, wherein the olefin polymer comprises a polypropylene homopolymer and/or a propylene-based copolymer.

Aspect 56. The olefin polymerization process defined in any one of aspects 39-55 or the polymerization reactor system defined in aspect 38, wherein the polymerization conditions comprise a polymerization reaction temperature in a range from about 60° C. to about 120° C. and a polymerization reaction pressure in a range from about 200 to about 1000 psig (about 1.4 to about 6.9 MPa).

Aspect 57. The olefin polymerization process defined in any one of aspects 39-56 or the polymerization reactor system defined in aspect 38, wherein the polymerization conditions are substantially constant, e.g., for a particular polymer grade.

Aspect 58. The olefin polymerization process defined in any one of aspects 39-57, wherein no hydrogen is added to the polymerization reactor system.

Aspect 59. The olefin polymerization process defined in any one of aspects 39-57, wherein hydrogen is added to the polymerization reactor system.

Aspect 60. The olefin polymerization process defined in any one of aspects 39-59, wherein the wavelength comprises a single wavelength or a range of wavelengths in the visible spectrum (from 380 nm to 780 nm).

Aspect 61. The olefin polymerization process defined in any one of aspects 39-59, wherein the wavelength comprises a single wavelength or a range of wavelengths in the 200 nm to 750 nm range.

Aspect 62. The olefin polymerization process defined in any one of aspects 39-59, wherein the wavelength comprises a single wavelength or a range of wavelengths in the 300 to 750 nm range, the 350 nm to 650 nm range, the 300 nm to 500 nm range, or the 300 nm to 400 nm range.

Aspect 63. The olefin polymerization process defined in any one of aspects 39-59, wherein the wavelength comprises a single wavelength or a range of wavelengths below 600 nm, below 525 nm, or below 500 nm.

Aspect 64. The olefin polymerization process defined in any one of aspects 39-63, wherein the wavelength is a single wavelength.

Aspect 65. The olefin polymerization process defined in any one of aspects 39-63, wherein the wavelength is a range of wavelengths spanning at least 25 nm, at least 50 nm, at least 100 nm, at least 200 nm, etc.

Aspect 66. The olefin polymerization process defined in any one of aspects 39-65, wherein the number-average molecular weight (Mn) of the olefin polymer is in any range disclosed herein, e.g., from about 5,000 to about 150,000 g/mol, from about 5,000 to about 50,000 g/mol, from about 10,000 to about 100,000 g/mol, etc.

Aspect 67. The olefin polymerization process defined in any one of aspects 39-66, wherein the weight-average molecular weight (Mw) of the olefin polymer is in any range disclosed herein, e.g., from about 50,000 to about 700,000 g/mol, from about 75,000 to about 500,000 g/mol, from about 100,000 to about 400,000 g/mol, etc.

Aspect 68. The olefin polymerization process defined in any one of aspects 39-67, wherein the density of the olefin polymer is in any range disclosed herein, e.g., from about 0.89 to about 0.96 g/cm$^3$, from about 0.91 to about 0.95 g/cm$^3$, from about 0.91 to about 0.94 g/cm$^3$, etc.

Aspect 69. The olefin polymerization process defined in any one of aspects 39-68, wherein the melt index (MI) of the olefin polymer is in any range disclosed herein, e.g., from 0 to about 25 g/10 min, from 0 to about 5 g/10 min, from 0 to about 1 g/10 min, etc.

Aspect 70. The olefin polymerization process defined in any one of aspects 39-69, wherein the high load melt index (HLMI) of the olefin polymer is in any range disclosed herein, e.g., from 0 to about 150 g/10 min, from about 2 to about 120 g/10 min, from about 4 to about 50 g/10 min, etc.

Aspect 71. The olefin polymerization process defined in any one of aspects 39-70, wherein the MI (or HLMI) of the olefin polymer produced by the process is greater than 50% of, greater than 80% of, greater than 100% of, greater than 120% of, greater than 150% of, etc., the MI (or HLMI) of an olefin polymer obtained using the supported chromium catalyst (without the irradiating step) and/or an olefin polymer obtained using an otherwise identical catalyst prepared using the same reductant at an elevated temperature (e.g., 300° C., 350° C., 400° C., 450° C., or 500° C.) without light irradiation, under the same polymerization conditions.

Aspect 72. An olefin polymer produced by the olefin polymerization process defined in any one of aspects 39-71.

Aspect 73. An article of manufacture comprising the olefin polymer defined in aspect 72.

Aspect 74. The method, system or process defined in any one of aspects 1-25 or 27-71, wherein the reductant comprises a compound with a C—H bond or a H—H bond.

Aspect 75. The method, system or process defined in aspect 74, wherein the reductant comprises a compound with a C—H bond.

Aspect 76. The method, system or process defined in aspect 74 or 75, wherein the reductant comprises a compound with a C—C bond.

Aspect 77. The method, system or process defined in aspect 74, wherein the reductant comprises H$_2$.

Aspect 78. The method, system or process defined in aspect 74, wherein the reductant comprises an alkane, an olefin, an aromatic, or any combination thereof (e.g., a $C_1$ to $C_{36}$ alkane, olefin, and/or aromatic; a $C_1$ to $C_{18}$ alkane, olefin, and/or aromatic; a $C_1$ to $C_{12}$ alkane, olefin, and/or aromatic; or a $C_1$ to $C_8$ alkane, olefin, and/or aromatic); alternatively, the reductant comprises a linear, branched, or cyclic alkane compound having up to 18 carbon atoms; or alternatively, the reductant comprises a hydrocarbon aromatic compound having up to 18 carbon atoms.

Aspect 79. The method, system or process defined in aspect 74, wherein the reductant comprises ethylene, 1-butene, 1-hexene, 1-octene, methane, ethane, propane, isobutane, n-pentane, isopentane, n-hexane, tetrafluoroethane, cyclohexane, adamantane, decalin, benzene, toluene, etc., or any combination thereof.

Aspect 80. The method, system or process defined in any one of aspects 1-25, 27-71, or 74-79, wherein a molar ratio of the reductant to chromium is in any suitable range or any range disclosed herein, e.g., at least about 0.25:1, at least about 0.5:1, at least about 1:1, at least about 10:1, at least about 100:1, at least about 1000:1, at least about 10,000:1, etc.

Aspect 81. An ethylene polymer having (or characterized by):
a ratio of Mw/Mn in a range from about 30 to about 110;
a ratio of Mz/Mw in a range from about 4 to about 10; and
a CY-a parameter in a range from about 0.2 to about 0.4.

Aspect 82. The polymer defined in aspect 81, wherein the ratio of Mw/Mn is in any range disclosed herein, e.g., from about 35 to about 105, from about 40 to about 100, from about 45 to about 95, or from about 50 to about 90.

Aspect 83. The polymer defined in aspect 81 or 82, wherein the ratio of Mz/Mw is in any range disclosed herein, e.g., from about 5 to about 9, from about 5 to about 8, from about 5.5 to about 7.5, or from about 6 to about 7.

Aspect 84. The polymer defined in any one of aspects 81-83, wherein the CY-a parameter is in any range disclosed herein, e.g., from about 0.23 to about 0.38, from about 0.25 to about 0.35, or from about 0.27 to about 0.34.

Aspect 85. The polymer defined in any one of aspects 81-84, wherein the ethylene polymer has a Mn in any range disclosed herein, e.g., from about 3,000 to about 12,000 g/mol, from about 4,000 to about 11,000 g/mol, from about 4,000 to about 10,000 g/mol, from about 5,000 to about 10,000 g/mol, or from about 5,500 to about 9,500 g/mol.

Aspect 86. The polymer defined in any one of aspects 81-85, wherein the ethylene polymer has a Mw in any range disclosed herein, e.g., from about 250,000 to about 700,000 g/mol, from about 300,000 to about 675,000 g/mol, from about 350,000 to about 625,000 g/mol, or from about 375,000 to about 600,000 g/mol.

Aspect 87. The polymer defined in any one of aspects 81-86, wherein the ethylene polymer has a number of long chain branches (LCBs) in any range disclosed herein, e.g., from about 0.5 to about 4, from about 0.5 to about 3, from about 0.7 to about 2.8, or from about 1 to about 2.5 LCBs per million total carbon atoms.

Aspect 88. The polymer defined in any one of aspects 81-87, wherein the ethylene polymer has a HLMI in any range disclosed herein, e.g., less than or equal to about 10, less than or equal to about 8, less than or equal to about 5, or less than or equal to about 4 g/10 min.

Aspect 89. An ethylene polymer having (or characterized by):
a ratio of Mw/Mn in a range from about 6 to about 15;
a ratio of Mz/Mw in a range from about 30 to about 70; and
a melt index in a range from about 0.5 to about 10 g/10 min.

Aspect 90. The polymer defined in aspect 89, wherein the ratio of Mw/Mn is in any range disclosed herein, e.g., from about 7 to about 14, from about 8 to about 13, from about 8 to about 12, or from about 9 to about 10.

Aspect 91. The polymer defined in aspect 89 or 90, wherein the ratio of Mz/Mw is in any range disclosed herein, e.g., from about 35 to about 65, from about 40 to about 60, from about 45 to about 55, or from about 47 to about 51.

Aspect 92. The polymer defined in any one of aspects 89-91, wherein the melt index is in any range disclosed herein, e.g., from about 0.5 to about 5, from about 0.7 to about 7, or from about 1 to about 5 g/10 min.

Aspect 93. The polymer defined in any one of aspects 89-92, wherein the ethylene polymer has a Mn in any range disclosed herein, e.g., from about 10,000 to about 25,000 g/mol, from about 13,000 to about 22,000 g/mol, from about 15,000 to about 20,000 g/mol, or from about 16,000 to about 18,000 g/mol.

Aspect 94. The polymer defined in any one of aspects 89-93, wherein the ethylene polymer has a Mw in any range disclosed herein, e.g., from about 100,000 to about 400,000 g/mol, from about 100,000 to about 300,000 g/mol, from about 110,000 to about 250,000 g/mol, or from about 140,000 to about 200,000 g/mol.

Aspect 95. The polymer defined in any one of aspects 89-94, wherein the ethylene polymer has a number of long chain branches (LCBs) in any range disclosed herein, e.g., less than or equal to about 2, less than or equal to about 1, less than or equal to about 0.8, less than or equal to about 0.5, or less than or equal to about 0.2 LCBs per million total carbon atoms.

Aspect 96. An article of manufacture comprises the polymer defined in any one of aspects 81-95.

What is claimed is:

1. A method for reducing a chromium catalyst for olefin polymerization, the method comprising:
   irradiating a reductant comprising a C—H bond and a supported chromium catalyst comprising chromium in a hexavalent oxidation state with a light beam having a flux of at least 5,000 lux at a wavelength in the UV-visible spectrum to reduce at least a portion of the supported chromium catalyst to form a reduced chromium catalyst.

2. The method of claim 1, wherein:
   the reductant comprises ethylene, 1-butene, 1-hexene, 1-octene, methane, ethane, propane, isobutane, n-pentane, isopentane, n-hexane, tetrafluoroethane, cyclohexane, adamantane, decalin, benzene, toluene, or any combination thereof; and
   the supported chromium catalyst comprises a solid oxide selected from silica, alumina, silica-alumina, silica-coated alumina, aluminum phosphate, aluminophosphate, heteropolytungstate, titania, zirconia, magnesia, boria, zinc oxide, silica-titania, silica-zirconia, alumina-titania, alumina-zirconia, zinc-aluminate, alumina-boria, silica-boria, aluminophosphate-silica, titania-zirconia, or any combination thereof.

3. The method of claim 1, wherein the supported chromium catalyst comprises chromium/silica, chromium/silica-titania, chromium/silica-titania-magnesia, chromium/silica-alumina, chromium/silica-coated alumina, chromium/aluminophosphate, or any combination thereof.

4. The method of claim 1, wherein the supported chromium catalyst has:
   a total pore volume in a range from about 0.9 to about 3 mL/g;
   a BET surface area in a range from about 200 to about 700 m$^2$/g; and
   an average particle size in a range from about 25 to 250 μm.

5. The method of claim 1, further comprising a step of calcining to form the supported chromium catalyst comprising chromium in the hexavalent oxidation state.

6. The method of claim 1, wherein:
   the reductant comprises an alkane or aromatic hydrocarbon compound with up to 36 carbon atoms; and
   the wavelength comprises a single wavelength or a range of wavelengths in a range from about 300 nm to about 500 nm.

7. The method of claim 1, wherein:
   the reductant comprises a compound with a C—C bond and a C—H bond; and
   the wavelength comprises a single wavelength or a range of wavelengths below about 500 nm.

8. The method of claim 1, wherein:
   the light beam comprises wavelengths above 350 nm and below 500 nm.

9. The method of claim 1, wherein:
   less than or equal to about 50 wt % of the chromium in the reduced chromium catalyst is in the hexavalent oxidation state; and
   the chromium in the reduced chromium catalyst has an average valence of less than or equal to about 5.

10. The method of claim 1, wherein:
    the reduced chromium catalyst has a catalyst activity at least 10% greater than that of the supported chromium catalyst, under slurry polymerization conditions at a temperature of 105° C. and a pressure of 550 psig; and/or
    the reduced chromium catalyst has a catalyst activity at least 10% greater than an otherwise identical catalyst prepared using the reductant at 400° C. without light irradiation, under slurry polymerization conditions at a temperature of 105° C. and a pressure of 550 psig.

11. An olefin polymerization process comprising:
(I) irradiating a reductant comprising a C—H bond and a supported chromium catalyst comprising chromium in a hexavalent oxidation state with a light beam having a flux of at least 5,000 lux at a single wavelength or a range of wavelengths in a range from about 300 nm to about 500 nm to convert at least a portion of the supported chromium catalyst to form a reduced chromium catalyst; and
(II) contacting the reduced chromium catalyst and an optional co-catalyst with an olefin monomer and an optional olefin comonomer in a polymerization reactor system under polymerization reaction conditions to produce an olefin polymer.

12. The process of claim 11, wherein:
the reductant comprises a hydrocarbon compound with up to 36 carbon atoms; and
the polymerization reactor system comprises a loop slurry reactor, a fluidized bed reactor, a solution reactor, or a combination thereof.

13. The process of claim 12, wherein the light beam is from a blue light source or a UV light source.

14. The process of claim 12, wherein the reductant and the supported chromium catalyst are irradiated with a light beam having a flux of from about 50,000 to about 500,000 lux.

15. The process of claim 11, wherein:
the reductant comprises a compound with a C—C bond; and
a molar ratio of the reductant to chromium in the hexavalent oxidation state is at least about 1:1.

16. The process of claim 11, wherein:
the olefin polymer comprises an ethylene homopolymer, an ethylene/1-butene copolymer, an ethylene/1-hexene copolymer, an ethylene/1-octene copolymer, a propylene homopolymer, a propylene-based copolymer, or a combination thereof;
the HLMI of the olefin polymer produced by the process is greater than 80% of that of (i) an olefin polymer obtained using the supported chromium catalyst instead of the reduced chromium catalyst, and/or (ii) an olefin polymer obtained using an otherwise identical reduced chromium catalyst prepared using the reductant at 400° C. without light irradiation, under the same polymerization conditions.

17. A catalyst preparation system comprising:
(a) a catalyst preparation vessel configured to irradiate a slurry of a supported chromium catalyst in a diluent with a light beam at a wavelength in the UV-visible spectrum;
(b) a catalyst inlet configured to introduce the slurry of the supported chromium catalyst into the catalyst preparation vessel, wherein at least a portion of the chromium is in the hexavalent oxidation state;
(c) a reduced catalyst outlet configured to withdraw a slurry of a reduced chromium catalyst from the catalyst preparation vessel; and
(d) a controller that controls a residence time of the slurry of the supported chromium catalyst in the catalyst preparation vessel, a temperature of the catalyst preparation vessel, an intensity of the light beam, the wavelength of the light beam, an amount of the reduced chromium catalyst, a molar ratio of a reductant to chromium of the supported chromium catalyst, or any combination thereof.

18. The catalyst preparation system of claim 17, wherein:
a source of the light beam is sunlight, a fluorescent white light, a UV lamp, a LED diode, or any combination thereof;
the wavelength comprises a single wavelength or a range of wavelengths below 600 nm;
the diluent comprises a hydrocarbon;
the system further comprises a lamp assembly inside or outside the catalyst preparation vessel; and
the catalyst preparation system further comprises a co-catalyst inlet configured to introduce a co-catalyst feed stream into the catalyst preparation vessel.

19. A polymerization reactor system comprising:
the catalyst preparation system of claim 17; and
a reactor configured to contact the reduced chromium catalyst with an olefin monomer and an optional olefin comonomer under polymerization reaction conditions to produce an olefin polymer, wherein the reactor is a loop slurry reactor, a fluidized bed reactor, or a combination thereof.

20. The polymerization reactor system of claim 19, wherein the polymerization reactor system comprises a single reactor.

21. The polymerization reactor system of claim 19, wherein the polymerization reactor system comprises two or more reactors.

22. The polymerization reactor system of claim 19, wherein the reactor is the loop slurry reactor.

23. The polymerization reactor system of claim 19, wherein the polymerization reactor system further comprises a lamp assembly inside or outside the catalyst preparation vessel.

24. The polymerization reactor system of claim 19, wherein a source of the light beam is configured to irradiate the slurry with at least 10,000 lux.

25. The polymerization reactor system of claim 19, wherein a source of the light beam is a blue light source or a UV light source.

26. The polymerization reactor system of claim 19, wherein the olefin polymer comprises an ethylene homopolymer, an ethylene/1-butene copolymer, an ethylene/1-hexene copolymer, an ethylene/1-octene copolymer, or a combination thereof.

* * * * *